United States Patent
Mallya et al.

(10) Patent No.: US 10,803,773 B2
(45) Date of Patent: *Oct. 13, 2020

(54) IN-LINE PRODUCTION OF LINERLESS LABELS

(71) Applicant: FLEX R&D INC., Beverly Hills, CA (US)

(72) Inventors: Prakash Mallya, Sierra Madre, CA (US); David Nicholas Edwards, Pasadena, CA (US)

(73) Assignee: MALLYA CONSULTING LLC, Sierra Madre, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/746,916

(22) Filed: Jan. 19, 2020

(65) Prior Publication Data

US 2020/0152093 A1 May 14, 2020

Related U.S. Application Data

(63) Continuation-in-part of application No. 16/253,145, filed on Jan. 21, 2019, now Pat. No. 10,573,204,
(Continued)

(51) Int. Cl.
*G09F 3/02* (2006.01)
*B65C 9/22* (2006.01)
(Continued)

(52) U.S. Cl.
CPC .............. *G09F 3/02* (2013.01); *B05D 1/02* (2013.01); *B65C 9/18* (2013.01); *B65C 9/1803* (2013.01);
(Continued)

(58) Field of Classification Search
None
See application file for complete search history.

(56) References Cited

U.S. PATENT DOCUMENTS

| 856,689 | A | * | 6/1907 | Fehrenbach | .............. B42D 1/08 |
| | | | | | 281/38 |
| 3,027,271 | A | * | 3/1962 | Plasse | ........................ C09J 7/35 |
| | | | | | 428/148 |

(Continued)

FOREIGN PATENT DOCUMENTS

| WO | WO 2009/030893 A1 | 3/2009 |
| WO | WO 2014/041239 A1 | 3/2014 |

OTHER PUBLICATIONS

UPM Raflatac OY, "A Linerless Label", machine translation of DE 212013000198 U1, Apr. 15, 2015 (Year: 2015).*
(Continued)

*Primary Examiner* — Anish P Desai
(74) *Attorney, Agent, or Firm* — Rajendra Gurudas Sardesai

(57) ABSTRACT

According to an embodiment of the present disclosure, a method of labeling a plurality of products includes coating a pressure sensitive adhesive to a roll of face stock, the roll of face stock configured to be converted to a plurality of individual labels aligned in a single lane; singulating an individual label from the roll of face stock; and applying the individual label to a product of the plurality of products, wherein the coating, singulating and applying are conducted sequentially in a single continuous operation with a single continuous web of material.

21 Claims, 9 Drawing Sheets

US 10,803,773 B2
Page 2

Related U.S. Application Data which is a continuation-in-part of application No. 16/104,112, filed on Aug. 16, 2018, now Pat. No. 10,325,526, which is a continuation of application No. 15/687,429, filed on Aug. 25, 2017, now Pat. No. 10,083,635.

(60) Provisional application No. 62/806,812, filed on Feb. 16, 2019, provisional application No. 62/460,873, filed on Feb. 20, 2017.

(51) Int. Cl.
- *B65C 9/18* (2006.01)
- *B65C 9/46* (2006.01)
- *G09F 3/10* (2006.01)
- *B05D 1/02* (2006.01)
- *C09J 5/00* (2006.01)
- *C09J 7/20* (2018.01)
- *B32B 38/00* (2006.01)
- *B32B 37/12* (2006.01)
- *B32B 38/18* (2006.01)

(52) U.S. Cl.
CPC ............ *B65C 9/22* (2013.01); *B65C 9/2204* (2013.01); *B65C 9/46* (2013.01); *C09J 5/00* (2013.01); *C09J 7/20* (2018.01); *G09F 3/10* (2013.01); *B32B 37/12* (2013.01); *B32B 38/0004* (2013.01); *B32B 38/105* (2013.01); *B32B 38/185* (2013.01); *C09J 2201/20* (2013.01); *C09J 2201/606* (2013.01); *C09J 2203/334* (2013.01); *G09F 2003/0229* (2013.01); *G09F 2003/0241* (2013.01); *Y10T 156/1056* (2015.01); *Y10T 156/1057* (2015.01); *Y10T 156/1062* (2015.01); *Y10T 156/1064* (2015.01); *Y10T 156/1082* (2015.01); *Y10T 156/1304* (2015.01)

(56) References Cited

U.S. PATENT DOCUMENTS

| | | | | |
|---|---|---|---|---|
| 3,247,041 | A | 4/1966 | Henderson | |
| 3,461,014 | A | 8/1969 | James | |
| 3,929,270 | A * | 12/1975 | Keith | B23K 9/0356 228/50 |
| 4,082,595 | A | 4/1978 | Slater | |
| 4,091,162 | A * | 5/1978 | Henderson | B01J 13/14 428/327 |
| 4,156,626 | A | 5/1979 | Souder | |
| 4,397,410 | A | 8/1983 | Schueler | |
| 4,468,274 | A | 8/1984 | Adachi | |
| 4,556,595 | A * | 12/1985 | Ochi | C09J 7/10 428/143 |
| 4,851,383 | A | 7/1989 | Fickenscher et al. | |
| 5,358,281 | A | 10/1994 | Greig | |
| 5,480,502 | A | 1/1996 | Rello et al. | |
| 5,569,515 | A | 10/1996 | Rice, II et al. | |
| 5,702,771 | A | 12/1997 | Shipston et al. | |
| 5,749,990 | A | 5/1998 | Rello et al. | |
| 5,750,192 | A | 5/1998 | Smith | |
| 6,031,553 | A | 2/2000 | Nagamoto et al. | |
| 6,043,190 | A | 3/2000 | Ichikawa et al. | |
| 6,294,038 | B1 | 9/2001 | Majkrzak | |
| 6,326,450 | B1 | 12/2001 | Shipston et al. | |
| 6,388,692 | B1 | 5/2002 | Iwata et al. | |
| 6,415,842 | B1 | 7/2002 | Vasilakes et al. | |
| 6,492,019 | B1 | 12/2002 | Shipston et al. | |
| 6,500,536 | B1 | 12/2002 | Yamada et al. | |
| 6,501,495 | B1 | 12/2002 | Ichikawa et al. | |
| 6,540,865 | B1 * | 4/2003 | Miekka | G09F 3/10 156/249 |
| 6,695,501 | B2 | 2/2004 | Nedblake et al. | |
| 6,803,100 | B1 | 10/2004 | Hintz et al. | |
| 7,026,047 | B2 | 4/2006 | Krolzig | |
| 8,573,276 | B2 | 11/2013 | Wade et al. | |
| 10,083,635 | B2 * | 9/2018 | Mallya | B05D 1/02 |
| 10,573,204 | B2 * | 2/2020 | Mallya | B65C 9/46 |
| 2003/0041963 | A1 | 3/2003 | Gong et al. | |
| 2004/0166309 | A1 | 8/2004 | Gong et al. | |
| 2005/0061435 | A1 * | 3/2005 | Everaerts | C09J 5/00 156/314 |
| 2010/0300613 | A1 * | 12/2010 | Stogbauer | C09J 7/35 156/256 |
| 2012/0034402 | A1 | 2/2012 | Henderson | |
| 2014/0066539 | A1 | 3/2014 | Tobing | |

OTHER PUBLICATIONS

International Search Report in International application No. PCT/US2018/018840.

International Preliminary Report on Patentability in International application No. PCT/US2018/018840.

Letter regarding Commonly Assigned Applications.

* cited by examiner

IN-LINE PRODUCTION OF LINERLESS LABELS

CROSS-REFERENCE TO RELATED PATENT APPLICATION

This application claims priority to U.S. Provisional Patent Application No. 62/806,812 filed Feb. 16, 2019 and is a continuation-in-part of co-pending U.S. patent application Ser. No. 16/253,145 filed on Jan. 21, 2019, which is continuation-in-part of and claims priority to U.S. patent application Ser. No. 16/104,112 filed on Aug. 16, 2018, now U.S. patent Ser. No. 10/325,526 issued on Jun. 18, 2019, which is continuation of and claims priority to U.S. patent application Ser. No. 15/687,429 filed on Aug. 25, 2017, now U.S. patent Ser. No. 10/083,635 issued on Sep. 25, 2018, which claims priority to U.S. Provisional Patent Application No. 62/460,873, filed Feb. 20, 2017, the entire content of which is incorporated herein by reference.

FIELD

The following description relates generally to linerless pressure sensitive adhesive labels, and method and system of manufacturing the same.

BACKGROUND

A related art pressure sensitive adhesive (PSA) label stock has a multi-layer laminated structure including four necessary elements: a face or face-stock, an adhesive layer, a release system and a liner. This label stock, which is commonly produced in roll form including multiple individual labels, is converted into individual labels, typically after printing with indicia. An end-user may then apply an individual label to a product. The residual liner, coated with the release system, becomes a waste stream. This waste stream is collected on a rewind stand following dispensing (i.e., the application of labels) and may subsequently be land-filled or sold into low value reprocessing.

To reduce the waste generated through the labeling process, the labeling industry has sought to find ways to affect labeling of PSA-type materials without utilizing a liner and the associated release system, thus significantly improving material and supply chain efficiencies, reducing cost and eliminating an increasingly problematic waste stream. Only limited progress has been made to achieving this goal, commonly in the form of so-called "liner-free" labels and "activatable" labels.

The liner-free labels are typically manufactured by first printing one side of the face stock with an indicia and then applying a release system to the same side of the printed face stock before coating the reverse side of the face stock with an adhesive to create a self-wound label stock that does not include the liner. While the liner has been eliminated, the release system is still coated on the face-stock, and therefore does not deliver the full cost potential of a true linerless solution.

There remains a need for a true linerless solution that eliminates both the liner and the release system and does not replace either with another component.

SUMMARY

An aspect according to one or more embodiments of the present invention is directed toward a method of labeling a plurality of products, the labels are free of any liner and any release system and are not replaced with any other material.

Another aspect according to one or more embodiments of the present invention is directed toward a system of labeling a plurality of products, the labels are free of any liner and any release system and are not replaced with any other material.

Additional aspects will be set forth in part in the description which follows, and, in part, will be apparent from the description or may be learned by practice of the presented embodiments.

According to an embodiment of the present disclosure, a method of labeling a plurality of products is provided. The method includes coating a pressure sensitive adhesive to a roll of face stock, the roll of face stock configured to be converted to a plurality of individual labels aligned in a single lane; singulating an individual label from the roll of face stock; and applying the individual label to a product of the plurality of products, wherein the coating, singulating and applying are conducted sequentially in a single continuous operation with a single continuous web of material.

In one embodiment, no winding or rewinding of the roll of face stock is conducted between the coating of the pressure sensitive adhesive, the singulating and the applying of the individual label.

In one embodiment, the method may further include weakening the roll of face stock to enable singulating of individual labels. The weakening of the roll of face stock may be conducted prior to the coating of the pressure sensitive adhesive and including perforating or weakening a borderline of an individual label.

In one embodiment, the weakening of the roll of face stock may be conducted after the coating of the pressure sensitive adhesive and prior to the singulating of the individual label, and including cutting along a borderline of an individual label utilizing a laser, a cutting die, and/or a knife.

In one embodiment, the method may further include printing an indicia on the face stock. The printing may be conducted prior to the coating of the pressure sensitive adhesive at a site different from a site for the coating of the pressure sensitive adhesive.

In one embodiment, the printing may be conducted prior to the coating of the pressure sensitive adhesive at a same site as a site for the coating of the pressure sensitive adhesive and may be conducted sequentially with the coating, singulating and applying.

The roll of face stock may have a first indicia prior to the printing, and the printing may provide a second indicia to the roll of face stock.

The pressure sensitive adhesive may have a coat weight of about 3 gsm to about 20 gsm.

The pressure sensitive adhesive may have a 180° peel of about 1 N/inch to about 20 N/inch.

In one embodiment, the method may further include unwinding the roll of face stock prior to the coating of the pressure sensitive adhesive, wherein a total time needed from unwinding a section of the face stock corresponding to an individual label to a completion of the applying of the individual label to a product is about 60 seconds or less.

In one embodiment, the method may further include curing the pressure sensitive adhesive after the coating of the pressure sensitive adhesive and prior to the singulating of the individual label.

The curing may be through a radiation source with a dosage of about 2 mJ/cm$^2$ to about 50 mJ/cm$^2$.

The coating may be conducted at a temperature of about 60° C. to about 170° C.

In one embodiment, the applying of the individual label may be about 10 seconds or less after the coating of the pressure sensitive adhesive.

The coating of the pressure sensitive adhesive may be through die coating, screen coating, and/or spray coating.

According to an embodiment of the present disclosure, a system to label a plurality of products is provided. The system includes a coating station to coat a pressure sensitive adhesive to a roll of face stock, the roll of face stock configured to be converted to a plurality of individual labels aligned in a single lane; a singulating station to singulate an individual label from the roll of face stock; and a dispensing station to apply the individual label to a product of the plurality of products, wherein the coating station, the singulating station and dispensing station are located at a same site to provide sequential coating of the pressure sensitive adhesive, singulating of the individual label and applying of the individual label.

In one embodiment, the system may further include a transportation station to move the face stock from an unwinding station to the coating station, the singulating station and the dispensing station sequentially.

The transportation station may include a belt.

In one embodiment, the system may further include a weakening station to create separation between adjacent individual labels.

In one embodiment, the system may further include an accumulation station between the coating station and the singulating station to accumulate the coated face stock when a speed of the face stock at the coating station is faster than a speed of the face stock at the singulating station.

In one embodiment, the system may further include an (intermediate) transportation system and accumulation station between the coating station and the singulating station to accumulate the coated face stock when a speed of the face stock at the coating station is faster than the speed of the face stock at the singulating station.

In one embodiment, the system may further include a printing station to print an indicia on the face stock.

According to an embodiment of the present disclosure, a pressure sensitive adhesive label consists of a face stock; an indicia on the face stock; and a pressure sensitive adhesive on the face stock, wherein the pressure sensitive adhesive has a coat weight of about 3 gsm to about 20 gsm, and a 180° peel of about 1 N/inch to about 20 N/inch.

An embodiment of the present invention consists of a method of labeling a plurality of products using a pre-weakened roll of face stock coated with a pressure sensitive adhesive (PSA) whose surface has been detackifed with a material which is coated, sprayed, printed, dusted, and/or otherwise applied. This roll is configured to be converted to a plurality of individual labels aligned in a single lane; singulating an individual label from the roll of face stock; and applying the individual labels to a plurality of products, wherein the detackified pressure sensitive adhesive layer is liquified and rendered tacky by heat and/or Infra-red (IR) radiation prior to application of the label. The roll of facestock could be i) weakened before applying the PSA and the detack layer or ii) weakened after applying the PSA and detack layer or iii) weakened after applying the PSA layer but before applying the detack layer or iv) weakened in a separate process step at a convertor (who will typically also print the roll, putting indicia on individual labels, and slit the roll to create single lanes of label material). An embodiment of the present invention deals with making and applying linerless labels without using a release layer or coating or a release coated liner of any kind.

Another embodiment of the present invention provides a web that is coated with a PSA on a high speed coater and the PSA surface is covered with a detack layer (by coating, spraying, printing, or otherwise dusting with a powdery material) at high speed, and the web is pre-weakened and printed with graphics and wound up without using or needing a release liner or a release coating. Alternately, a roll of film can be printed by a convertor followed by coating of a UV curable PSA, applying a detack material on top of the PSA, and pre-weakened to allow easy dispensing. The pre-weakening can be done prior to printing, after printing, or after adhesive coating or after applying detack layer. This pre-weakened roll is readied to be used at the product labelling location by using a Near Infra-Red (NIR) or a thermal unit to render the label tacky followed by applying it to the product. On exposure to the NIR or heat, the protective layer of the detack material melts, becomes tacky to touch and migrates into the PSA layer, rendering the PSA layer also tacky to touch. Being compatible with the PSA, the entire laminate remains clear and aggressively tacky thus forming a label that provides the no-label look to the product. This provides a novel linerless solution without the need for a release coating or a release liner.

Since the PSA coating is done on an adhesive coating line or by a convertor who coats and converts PSA coated products, a conventional PSA such as an emulsion, hot melt, solution or a radiation curable PSA can be used. The PSA is coated by any coating method such as roll, die, Meyer rod, curtain coating, comma coating etc. The PSA can also be deposited on the web by printing or spraying leading to a discontinuous layer. The adhesive deposited on the web can be dried using a conventional oven or in case of a hot melt, warm melt or a radiation curable adhesive, no drying is necessary and if needed, cured with radiation.

To eliminate the use of a liner or a release coating, the PSA layer is rendered non-tacky with a detack layer so that the roll can be self-wound without the adjacent layers sticking to each other under storage or unwinding conditions. The detack layer has be such that it can liquify and mix with underlying adhesive under the high-speed labeling conditions of about 600 bottles/minute i.e. at web speeds in excess of 150 feet per minute. The detack layer is chosen so that upon exposure to thermal or IR or NIR radiation it is transformed into a liquid which does not affect, and may enhance, the properties of the underlying adhesive. The detack layer can also be chosen wherein the detack layer sublimes on exposure to radiation rendering the PSA tacky. It can also be such that on exposure to radiation, it breaks down into smaller components and becomes tacky to touch. The detack layer can be i) melted and coated on the surface of the PSA using conventional coating techniques such as roll coating or die coating, or ii) the molten detack material is sprayed onto the surface of the PSA using a Nordson spray unit wherein the material either completely solidifies or partially solidifies prior to landing on the surface of the PSA, or iii) applied onto the PSA surface in the form of a powder which is deposited uniformly or in specific patterns as needed, or iv) printed on to the surface of the PSA using any of a number of printing techniques such as screen printing, ink-jet printing etc.

In one embodiment, the detack material is added in a continuous process by spraying the detack material onto the adhesive-coated web which is transported at a speed below the spray outlet. In one embodiment, the speed of the web is in a range 150-3000 ft/min. In another embodiment, the spraying is performed using a powder spray approach in which the powder is fluidized and pumped through a spray nozzle to create a spray of powder that falls on the adhesive web and is retained by the adhesive web as it passes under the spray head. In one embodiment, the spraying operation is conducted in a confined 'booth' so that overspray is contained, recovered and can be used again. The amount of powder retained by the web is determined by the rate at which the spray is ejected from the nozzle and the speed at which the web is traveling. In another embodiment, for wide adhesive webs, a bank of spray heads may be used. In one embodiment, the powder may be sprayed shortly after adhesive coating of the web. In another embodiment, the powder may be sprayed immediately before the web is rewound. In another embodiment, the powder is sprayed at a suitable point between adhesive coating of the web and rewinding of the web.

Some embodiments comprise cooling the web or cooling the spray as it leaves the spray orifice, or adding nucleating agents to crystallize the detack material rapidly before it gets deposited on the surface of the PSA. The choice of detack material and the speed of tackification is such that under labelling conditions of about 150 to 600 bottles/minute, the detack material gets transformed to render the PSA layer tacky to touch and attach to the container being labeled or decorated (bottle, package, a box or anything that needs to be labeled—henceforth called a container) with sufficient adhesion. The tackification time under these conditions is preferably less than about 4 seconds to provide labelling of about 150 bottles at a label width of about 4 inches and with an activation module of about 2.5 ft length along the machine direction. It is most preferably less than about 1 second to allow labelling speeds of about 600 bottles/minute. Even higher speeds and thus lower tackification times are achievable using higher number of IR emitters, increasing the length of the activation MR module, higher power (wattage) or combinations of these.

BRIEF DESCRIPTION OF THE DRAWINGS

These and other features and advantages of the present invention will be better understood by reference to the following detailed description when considered in conjunction with the accompanying drawings. It is understood that selected structures and features have not been shown in certain drawings so as to provide better viewing of the remaining structures and features.

DETAILED DESCRIPTION

Figure 1:
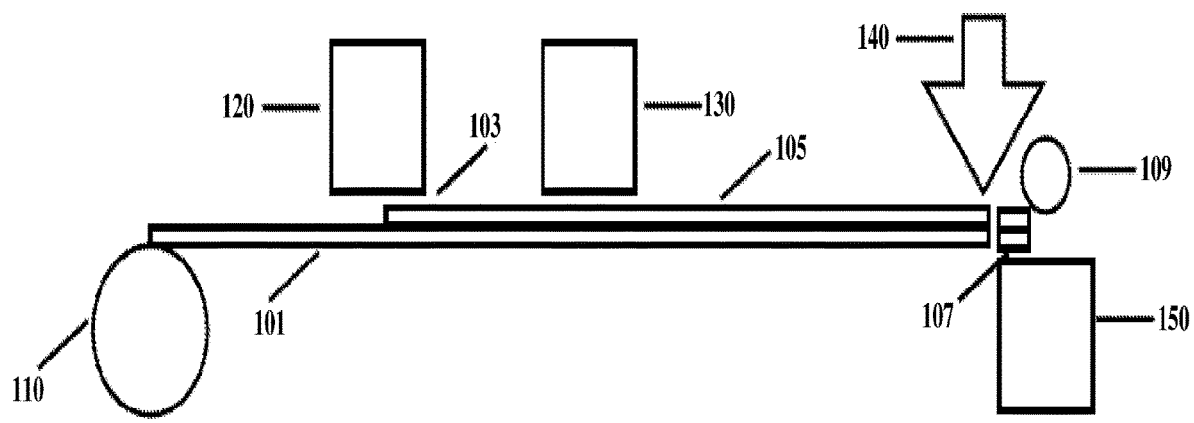
FIG. 1 is a schematic illustration of a method of labeling a plurality of products.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention."

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the terms "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

According to an embodiment of the present disclosure, a method of labeling a plurality of products is provided. The method includes coating a pressure sensitive adhesive to a roll of face stock, the roll of face stock configured to be converted to a plurality of individual labels aligned in a single lane; singulating an individual label from the roll of face stock; and applying the individual label to a product of the plurality of products, wherein the coating, singulating and applying are conducted sequentially in a single continuous operation with a single continuous web of material. Here, "a single continuous operation" refers to the process where the coating, singulating and applying onto a product is conducted on a given portion of the roll of face stock (i.e., a given portion of the web of material) in the same manufacturing line (e.g., labeling line) sequentially. The roll of face stock is continuously unwound from an unwinding station at the beginning of the manufacturing line, is transported through the coating station and other stations (e.g., a curing station) if applicable and is continuously singulated into individual labels and applied onto the products at the end of the manufacturing line. The process may include variable speed (e.g., different speed at different stations) but should not include winding up the entire roll of face stock and unwinding it again at a different time and/or a different location between the coating station and the singulating and applying stations.

According to an embodiment of the present disclosure, no winding or rewinding of the roll of face stock is conducted between the coating of the pressure sensitive adhesive, the singulating and the applying of the individual label. For example, the coating, singulating and applying may be conducted sequentially and continuously in time in the same process. Here, the adhesive coated face stock with indicia printed thereon forms a label, and the adhesive coated roll of face stock with indicia printed thereon becomes a roll of label stock, which may include a plurality of individual labels.

FIG. 1 is a schematic illustration of a method of labeling a plurality of products. Referring to FIG. 1, a roll of face stock 101 is unwound at a station 110. The face stock 101 passes through a coating station 120 and a layer of pressure sensitive adhesive 103 is coated on the face stock 101. In one embodiment, the face stock 101 passes through a curing station 130 to produce a cured pressure sensitive adhesive 105. In another embodiment, the curing station 130 is not included in the labeling process and the pressure sensitive adhesive is not cured.

The face stock 101 then passes through a singulating station 140 and an individual label 107 at the leading edge of the face stock is singulated (i.e., picked out) of the roll of face stock 101. Next, at the dispensing station 150, the individual label 107 is applied onto a product 109 from a plurality of products. While the singulating and applying of the individual label are described as being conducted respectively at the singulating station 140 and the dispensing station 150, embodiments of the present disclosure are not limited thereto, and the singulating and applying of the individual label may both be conducted at the dispensing station, for example, by a same tool that picks out an individual label and applies that label to a product and/or as part of a single process.

Figure 9:
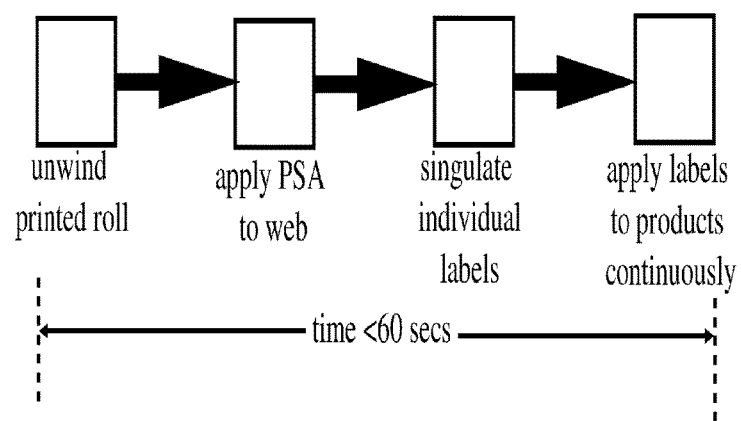
FIG. 9 is a schematic illustration of a labeling process.

As the labeled product 109 is moved away from the dispensing station, a next individual label is applied to a next product, and the process of labeling is conducted continuously. In one embodiment, a time span from the beginning of the coating of the PSA to the completion of the dispensing of the individual label is 60 seconds or less for each individual label. FIG. 9 is a schematic illustration of a labeling process. Referring to FIG. 9, according to an embodiment, it takes less than 60 seconds for an individual label from the roll of face stock (e.g., a printed roll of film or paper) to travel from the unwinding station to the completion of the applying of the label. In another embodiment, it takes less than 30 seconds for an individual label from the roll of face stock (e.g., a printed roll of film or paper) to travel from the unwinding station to the completion of the applying of the label.

The face stock may be made of any suitable material. For example, the face stock maybe paper based or film based (e.g., made of clear plastic material, opaque plastic material, foil, metalized paper, metalized film, laminate, etc.). In one embodiment, the face stock may have a thickness of about 20 microns or less, for example, about 10 microns or less, or about 8 microns.

The roll of face stock may be converted to a plurality of, for example, 500, 1000, 2000, 10000 or more of individual labels. Accordingly, the roll of face stock may be weakened to create separation between adjacent individual labels. The weakening of the roll of face stock may be conducted prior to the coating of the pressure sensitive adhesive and may include perforating or weakening a borderline of each individual label.

In one embodiment, the weakening of the roll of face stock may be conducted at a site different from the site where the labeling is conducted. For example, the weakening of the roll of face stock may be conducted at a manufacturing site where the roll of face stock is, for example, printed. When the roll of face stock reaches the unwinding station 110, the weakening has already been completed and a perforated line or a weakened line has been created between neighboring individual labels to define each individual label while the labels are still connected to one another. Hereinafter, the term "weakened" refers to the state of the label web (e.g., the roll of face stock) where individual labels can be easily separated from the web yet are still connected to the web. The weakened line may be the perforated line or a cutting line that cuts through only a portion of the web along the thickness direction. Throughout this description, the terms "web" and "roll" are used interchangeably.

In one embodiment, the weakening of the roll of face stock may be conducted after the coating of the pressure sensitive adhesive and prior to the singulating of the individual label and may include cutting along a borderline of an individual label utilizing a laser beam, a cutting die, or a knife. While example weakening methods have been described, embodiments of the present disclosure are not limited thereto, and any suitable weakening methods may be utilized.

Figure 2:
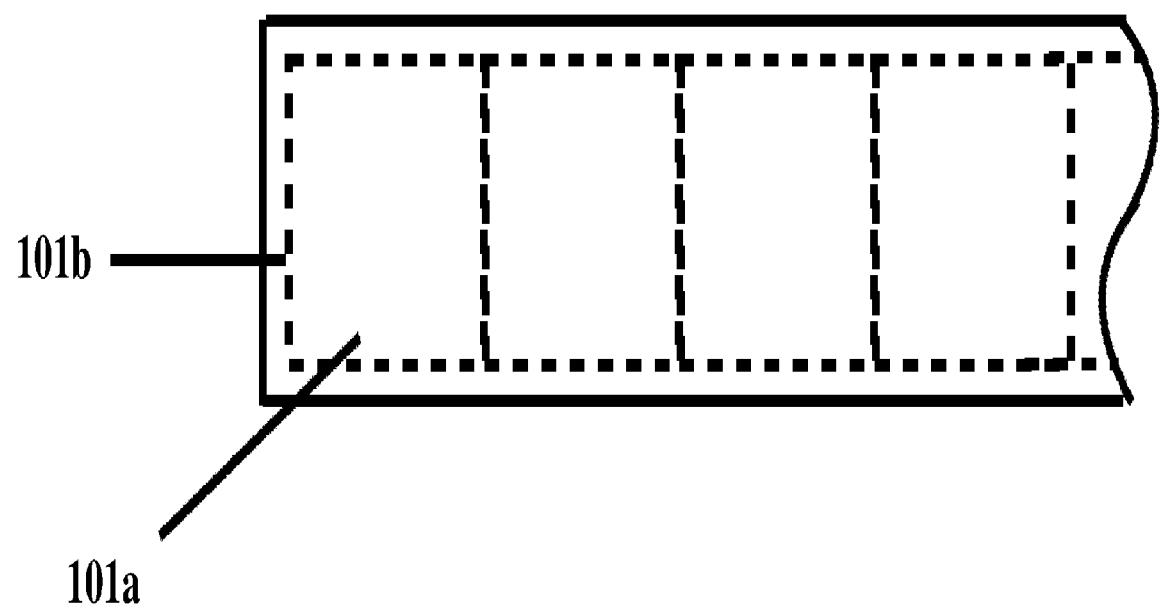
FIG. 2 is a schematic illustration of a section of a roll of face stock.

FIG. 2 is a schematic illustration of a section of a roll of face stock. Referring to FIG. 2, the roll of face stock 101 includes a plurality of individual labels 101a aligned in a single lane. The individual labels may have a perforation line or a weakened line 101b around its circumference, but embodiments of the present disclosure are not limited thereto, and the roll of face stock may not include the perforation line or weakened line 101b.

The face stock 101 may include an indicia printed on a surface thereof. In one embodiment, the printing may be conducted prior to the coating of the pressure sensitive adhesive at a site different from the site for the coating of the pressure sensitive adhesive. The printing process may not be part of same continuous labeling process described in association with FIG. 1.

The printing may be conducted at a label manufacturing site where the label face stock is printed and wound into the roll. The indicia may describe and advertise for the product to be labeled. For example, the indicia may be the product name, information about the product, a logo associated with the product, etc. This printing may be conducted on a continuous (roll-to-roll) press producing many labels across and down the web of the label stock. The web of the label stock may be slit into single lane labels prior to the labeling process described in association with FIG. 1.

Figure 3:
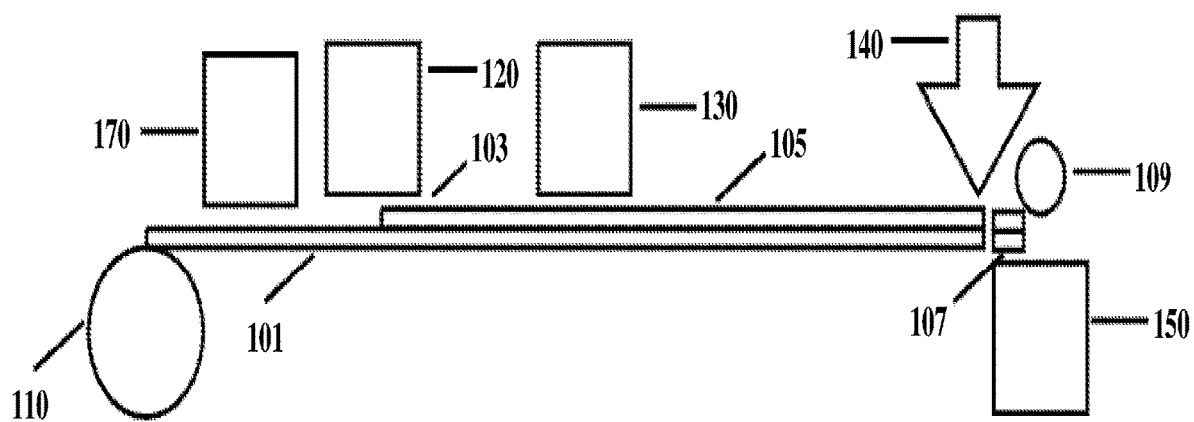
FIG. 3 is a schematic illustration of a process of labeling a plurality of products according to an embodiment of the present disclosure.

In one embodiment, the printing may be conducted prior to the coating of the pressure sensitive adhesive at the same site as the site for the coating of the pressure sensitive adhesive and may be conducted in the same process, e.g., sequentially and/or continuously in time, with the coating, singulating and applying. FIG. 3 is a schematic illustration of a process of labeling a plurality of products according to an embodiment of the present disclosure. In FIG. 3, the same reference numerals are utilized as in FIG. 1 to indicate similar process and materials, and the description thereof is not repeated again.

Referring to FIG. 3, a roll of face stock 101 including a plurality of labels 101a is unwound at the unwinding station 110. The face stock 101 passes through a printing station 170 first and a second indicia is printed on the face stock 101. Here, the roll of face stock 101 may have a first indicia printed at the manufacturing site, and the second indicia may add, for example, customized information to the labels 101a. In one embodiment, the roll of face stock 101 may not include the first indicia and the entire printing is conducted in-line at the printing station 170. The printing may be on either side of the face stock or on both sides (with the use of two printing stations).

The pressure sensitive adhesives may be either a hot melt PSA or a warm melt PSA. Any suitable pressure sensitive adhesive formulation that satisfies the following conditions maybe utilized: forms a clear pressure sensitive adhesive layer, flows well to form a high-quality coating (e.g., uniform coating without significant defects) at low coat weights, can be coated at temperatures ranging from about 60° C. to 170° C., and requires limited or no post-coating processing. For the purpose of the current description, the term "hot melt adhesive" or "hot melt pressure sensitive adhesive" refers to a pressure sensitive material that flows and is coatable to give a high-quality coating at temperatures of about 110° C. and above. The term "warm melts" or "warm melt pressure sensitive adhesive" refers to a pressure sensitive material that flows and is coatable to provide a high-quality coating at temperatures from about 60° C. to about 110° C. The coating may be conducted at a temperature of about 60° C. to about 170° C.

Suitable pressure sensitive adhesives may be based on acrylic polymers, acrylic copolymers such as vinyl acrylics and acrylic polymers with other comonomers such as dioctyl maleate and/or dibutyl fumarate, rubber based polymers such as block, tapered or random copolymers of styrene, butadiene, isoprene, or ethylene butylene, polyurethanes, silicone polymers or hybrids (graft or block or random copolymers of the above polymers), or combinations or blends of the above mentioned polymers with or without further additives. These polymers or copolymers can be random, block, or graft copolymers. The PSAs could be deposited on to the web from water-based systems such as emulsion polymers or copolymers, from solvents or as hotmelts (melted and coated well above 100° C.) or warm melts (melted and coated below about 100° C.) or as viscous syrups. The PSAs could be further crosslinked using thermal means or using any kind of radiation such as Ultra Violet, Electron Beam etc.

The polymers may be further modified with a wide range of additives. Non-limiting example additives include tackifiers, plasticizers, fillers, crosslinkers, viscosity modifiers, etc., which are either commercially available or custom synthesized. The additives may have very low vapor pressure at the coating temperature and may not emit ingredients that are harmful or odorous. Other suitable additives that may be utilized are those to enhance adhesion to wet bottles, or those that enhance adhesion under wet conditions.

The glass transition temperature (Tg) of the suitable pressure sensitive adhesives is typically about 20 to 25° C. below the usage/application temperature. For example, for room temperature applications, the PSA may have a Tg of lower than about 0° C.

Suitable pressure sensitive adhesives may be readily coated utilizing die coating, screen coating, spraying or other suitable coating technologies at temperatures which do not distort or affect the aesthetics of the face stock material upon which they are coated. The viscosities of the adhesive at the coating temperature should be suitable for forming a high-quality coating on the web. For example, the viscosity of the adhesive may range from about 100 centipoise to about 15,000 centipoise or even higher at the coating temperature.

The molecular weight of the polymers may be any suitable value as long as once formulated with the additives, the viscosity of the adhesive composition falls in the range of interest to form a high-quality coating at the coating temperature. For example, the weight average molecular weight may be about 20,000 Daltons to about 300,000 Daltons.

When a filmic face stock or substrate (e.g., face stock made of a polymer material) is utilized for the labels, it is typically sensitive to high temperatures. For such face stocks, an ultraviolet (UV) curable warm melt adhesive or a warm melt adhesive that does not require any curing may be utilized. The warm melt adhesive may be applied to the filmic web (i.e., filmic face stock web) at relatively lower temperatures (e.g., below about 130° C.) without distorting the web.

The coating temperature may be further lowered by dissolving the hot melt adhesive or warm melt adhesive in a low vapor pressure, high boiling point, benign co-monomer or low molecular weight polymer additive to make a syrup, coating the syrup on the web and curing it. The usage of a syrup further enhances the coating quality and also allows the usage of more heat sensitive filmic label face stocks such as polyethylene (PE).

The UV curable adhesive system (adhesive formulation), for example, may be based on either acrylic or rubber-based chemistries. Non-limiting examples of suitable UV curable adhesives include those from suppliers such as BASF, Henkel, or others. The hot melt adhesives may be readily and robustly coated at low coat weights. In one embodiment, the coat weight is in the range of about 3 gsm to about 20 gsm, or in the range of about 3 gsm to about 12 gsm, depending on the face stock. The adhesive may be coated utilizing any suitable coating technology.

In one embodiment, a hot melt adhesive is metered via a pump from a standard tank to a small slot die coater. The slot die coater can be obtained from any of a number of companies such as Acumeter, ITW, Nordson, etc. A slot die with a smoothing rod will ensure a high quality coating at the low coat weights. At the coating head the adhesive is applied to the reverse side of the printed and weakened face material (i.e., the adhesive is applied to a side opposite to the side where the indicia are printed on the face material) which is fed continuously into the die. The coating width may be easily adjusted utilizing shims on the die to match the width of the face stock web.

In one embodiment, the method may further include curing the pressure sensitive adhesive after the coating of the pressure sensitive adhesive and prior to the singulating of the individual label. The curing may be through a radiation source with a dosage of about 2 mJ/cm$^2$ to about 50 mJ/cm$^2$.

For example, after the hot or warm melt adhesive is applied to the label face stock, the face stock exits the die. Optionally, the adhesive is exposed to a short burst of UV radiation at a curing station (for example, at a dosage ranging from about 5 mJ/cm$^2$ to about 50 mJ/cm$^2$) which partially cures the adhesive and readies it to be applied directly to products at the singulating station.

In one embodiment, the post-coating unit (e.g., at the curing station) is compact and robust. A curing unit from a company such as Nordson, Dymax, Fusion etc., may be utilized for the curing. The radiation needed to cure may depend on the adhesive utilized and typically low dosages are adequate for these labels. For example, a lamp (such as a D bulb from Fusion) with an output of 500 watt/in or less may be utilized to effect the cure at a high speed and a short time.

The type of lamp utilized determines the wavelength of the radiation and may be selected according to the adhesive utilized. For example, the BASF acResin® A 250 adhesive with the low coat weight described above may be cured utilizing a lamp with a UV-C radiation at a wavelength of 250 nm to 290 nm and at dosage of about 2 to 50 mJ/cm$^2$. Lamps in a unit that is 6" wide and 8" long have been utilized after the web exits the die. The adhesive passes under the lamps and is exposed to a continuous burst of UV for a short period of time.

For clear filmic label face stock materials utilized for clear-on-clear applications, where the appearance of the final label on the product requires the adhesive to be uniform, clear and defect free, utilizing a continuous coating of a UV curable hot melt or warm melt adhesive has been found to be effective.

For paper-based labels and opaque filmic labels, where the adhesive cannot be seen after the label is applied onto the product, the coating methods may be selected to further provide cost advantages. In one embodiment, the hot melt adhesive is sprayed onto the printed web utilizing standard hot melt spray nozzles. Coating the adhesive by the spraying method may reduce the total amount of adhesive required, as it is not a continuous covering and it also does not require the contact of the coating system with the web (therefore reducing the web tension required to pull the web through the coating system to the singulating station). After spraying, the adhesive may be cured by UV radiation, if needed, as it passes under the lamps in the curing unit. The spraying can be done using a system such as a Universal™ Spray Nozzle system by Nordson.

Figure 4:
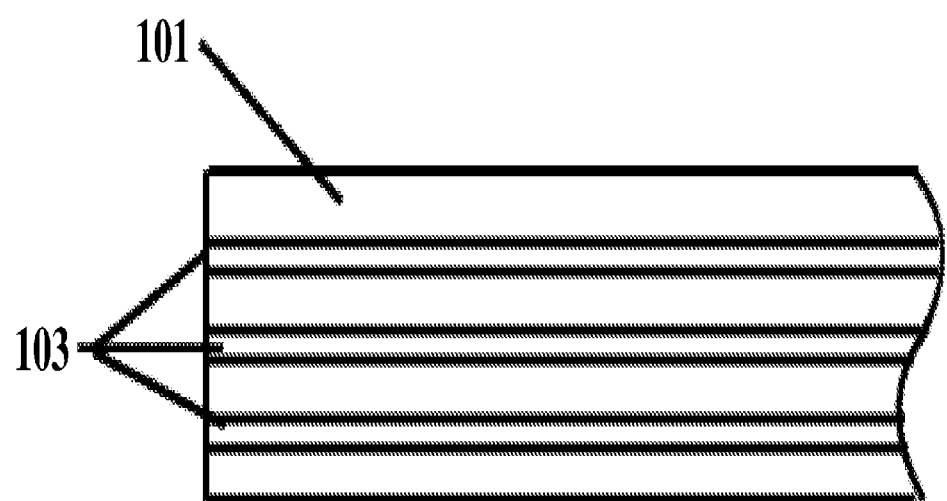
FIG. 4 is a schematic illustration of a face stock with adhesive coated in lanes.

In another embodiment, a standard die is deckled so as to coat the hot melt adhesive in lanes. This provides for a discontinuous coating and thereby reduces the amount of adhesive utilized. FIG. 4 is a schematic illustration of a face stock with adhesive coated in lanes. Referring to FIG. 4, adhesive 103 is coated on the face stock 101 in the shape of strips with each strip spaced apart from neighboring strips.

In another embodiment, the adhesive may be printed (e.g., with a discontinuous pattern) on to the web utilizing, for example, a Stork screen printer. In another embodiment the adhesive can be coated, printed or sprayed onto only certain regions of the label, for example like the inside borders of the labels. In another embodiment, only certain regions of the label are coated, printed or sprayed to minimize the amount of adhesive used.

The pressure sensitive adhesives according to embodiments of the present disclosure are chosen to meet the Dahlquist criteria, and more details on the types of PSA materials that can be utilized can be found in a wide range of patents and publications, one such being the Handbook of Pressure Sensitive Adhesive Technology, Second Edition, Ed. Donatas Satas, van Nostrand Reinhold, N Y, 1989, the entire content of which is incorporated herein by reference.

The pressure sensitive adhesive may have a 180° peel on a glass panel of about 1 N/inch to about 20 N/inch, for example, of about 5 N/inch to about 17 N/inch.

In one embodiment, no curing or drying is conducted after the coating of the adhesive, i.e., the adhesive coated on the label face stock does not require any curing or drying.

After the label face stock has been adhesive coated and optionally cured, it may be pulled through to the singulating station 140. At the singulating station 140, labels are removed from the web, singulated, and applied continuously to products that are presented to the dispensing station for continuous application to products. Singulation may occur by effectively tearing the label from a pre-weakened web or via die cutting utilizing, for example, a knife or die cutting tool.

The web may be pulled through to the singulating station (from the starting unwinding station 110 and through the coating station 120) utilizing, for example, a low surface energy belt (which contacts the adhesive side of the web), a friction belt (which contacts the printed side of the web) or a winder (which collects any matrix remaining after the labels have been removed from the web).

Figure 5A:
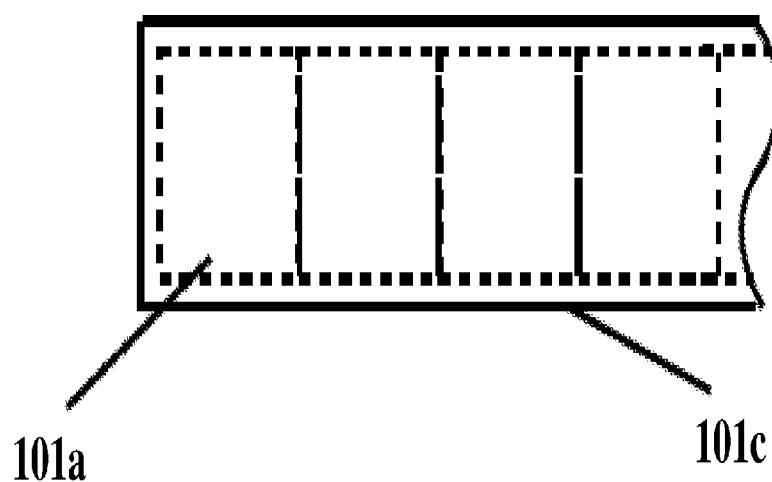
FIGS. 5A and 5B are schematic illustrations of a label face stock with a matrix.
Figure 5B:
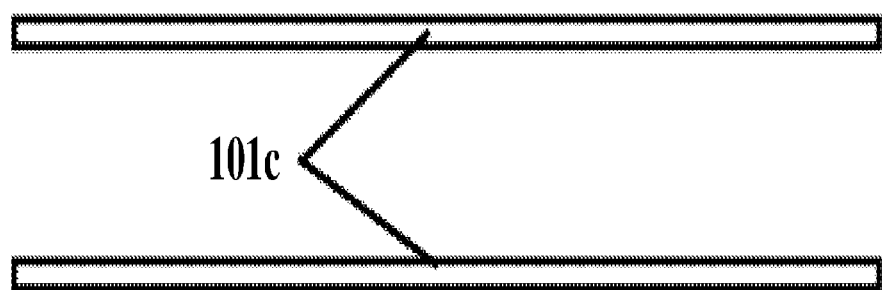

When a winder is utilized to pull the web, leaving a small (e.g., about ⅛") lane on either side of the labels may provide a sufficient matrix to allow a rewind station to pull the label stock through the entire process. FIGS. 5A and 5B are schematic illustrations of a label face stock with a matrix. Referring to FIG. 5A, a label face stock 101 includes the labels 101a and a matrix 101c at both sides of the labels 101a. The matrix 101c may have a width (from the edge of the label 101a to the corresponding edge of the face stock 101) of about ⅒" to about ½" (and could vary in width for labels which do not have square corners). Referring to FIG. 5B, after the label 101a has been picked out of the web and applied to the product, only the matrix 101c remains and it is rewound at the rewind station.

The usage of a winder after the dispensing station, which is common in related art labeling process (for collecting the matrix and pulling the label stock through the dispensing system) may be suitable for applying labels which are not rectangular or square shaped. For the irregularly shaped labels, there is often material left in the web (described here as the matrix) after singulation of the labels and this matrix can be readily collected on a winder. The winder maybe utilized in conjunction with the belt or without the belt.

Figure 6:
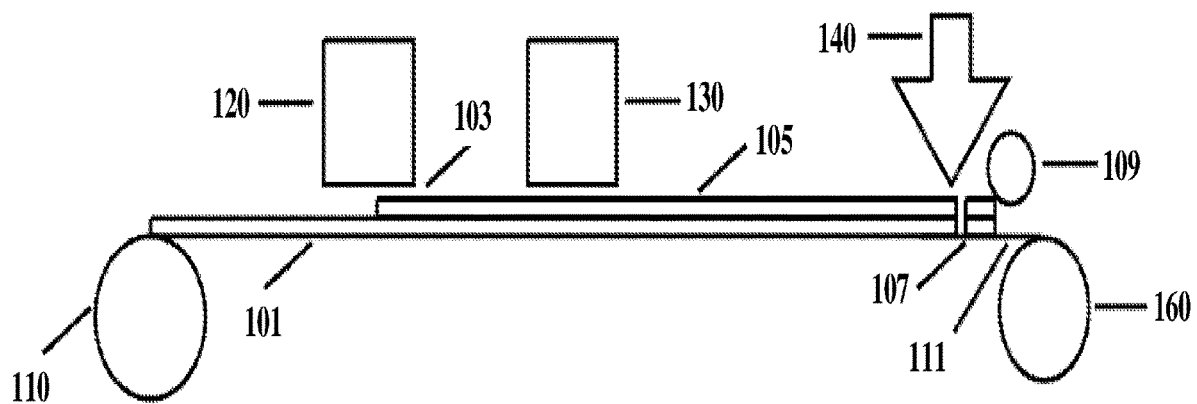
FIG. 6 is a schematic illustration of a labeling process according to an embodiment of the present disclosure.

FIG. 6 is a schematic illustration of a labeling process according to an embodiment of the present disclosure. In FIG. 6, the same reference numerals are utilized as in FIG. 1 to indicate similar process and materials, and the description thereof is not repeated again.

Referring to FIG. 6, a roll of face stock 101 including a plurality of labels 101a is unwound at unwinding station 110. The face stock 101 passes through a coating station 120 and an adhesive layer 103 is coated on the face stock 101. The adhesive may be optionally cured. The web may be optionally rotated 90° and reaches the singulating station 140. After the individual label 107 is singulated (i.e., picked out of the web) and applied onto the product 109, the left over matrix 111 is wound up at the winding station 160.

In one embodiment, the applying of the individual label may be about 10 seconds or less, for example, about 6 seconds or less, after the coating of the pressure sensitive adhesive. In one embodiment, the labeling process may be conducted at a rate of about 50 labels/min to about 1000 labels/min.

According to an embodiment of the present disclosure, a system for labeling a plurality of products is provided. The system includes a coating station to coat a pressure sensitive adhesive to a roll of face stock, the face stock including a plurality of individual labels aligned in a single lane; a singulating station to singulate an individual label from the roll of face stock; and a dispensing station to apply the individual label to a product of the plurality of products, wherein the coating station, the singulating station and dispensing station are located at a same site to provide continuous coating of the pressure sensitive adhesive, singulating of the individual label and applying of the individual label.

In one embodiment, the system may further include a transportation station for moving the face stock from an unwinding station to the coating station, the singulating station and the dispensing station sequentially. The transportation station may include a belt, e.g., a conveyer belt.

When singulation is enabled by cutting the individual labels in-line at the singulating station (or dispensing station if no separate singulating station is utilized), the web speed may vary at the point of dispensing. For example, the web may slow down or briefly stop to complete the cutting. This will lead a different web speed at the singulating station and at the coating station. To reduce or eliminate any coating defects that the web speed variation may cause, an accumulator may be utilized after the coating station, which may provide a method of maintaining a constant web speed through the coating station whilst removing slackness in the web caused by the web speed variations downstream. In another embodiment, a driven roller (or belt) may be included between the coating station and the accumulator, which may ensure that the web speed remains constant through the coating station. Similarly, in some embodiments, the application of the singulated label to product may require a variable speed and again an accumulator may be utilized to ensure that the web speed at the coating station is constant.

In one embodiment, the system may further include an accumulation station between the coating station and the singulating station to accumulate the face stock when the speed of the face stock at the coating station is faster than the speed of the face stock at the singulating station. For example, the system may include two transportation stations. A first station (e.g., a belt driven by a first roller) to move the face stock through the coating station at a first constant speed, and then a second station (or system) (e.g., a belt driven by a second roller) which moves the coated face stock through the singulating and dispensing stations at a second constant speed or a variable speed. The first and second constant speeds may be of different values at any moment in time (although the time-averaged speeds will be the same). The two transportation stations provide for a continuous web speed through the coating station and allow for a variable web speed through the singulating and dispensing stations. The accumulation could also be conducted in the form of a larger roll or a belt onto which the singulated labels are dispensed and further labeling or decoration of the objects (containers) can be done from this dispensing accumulation roll. This enables the coating to be done in a continuous manner.

In one embodiment, the system may further include a weakening station to create separation between adjacent individual labels. In one embodiment, the system may further include a printing station for printing an indicia on the face stock.

The labeling system according to embodiments of the present disclosure enables the elimination of both the liner and the release layer and does not replace either with another component. It thereby delivers on the true cost and environmental promise of a linerless solution. There is additional complexity at the point of dispensing, but this complexity is readily justified by the substantial savings, environmental benefits, and supply chain efficiencies offered by the invention. Further, according to an embodiment of the present disclosure, the face stock may have a thickness of about 20 microns or less. In related art labeling process, the usage of face materials below 25 microns is rare because die-cutting only the face stock and the adhesive layers over the release system and the liner becomes difficult at low thickness without damaging the liner and thereby the integrity of the total roll. The adhesive coat weight may be about 3 gsm to about 20 gsm, for example, less than 10 gsm, which is much lower than that used in a related art label and related art labeling system (which is typically greater than 15 gsm).

According to an embodiment of the present disclosure, an example label manufacturing process begins at the label manufacturing site, where a roll of face stock material (paper or film) is first printed, as is done today with related art labeling, with information and advertising that will be placed on the products to be labeled. During the same process, but after the printing, the face stock is perforated or weakened, utilizing, for example, a rotating die, to create a roll of printed material with individual labels defined by weakened areas at the extremities of each label. The roll of printed face stock, which carries the 'weakened' labels, is then slit to provide a single lane of labels. The printing and the slitting processes are substantially the same as the corresponding related art ones, except that the label face stocks are only weakened and not die cut through the entire label face stock.

The slit roll is then shipped off the manufacturing site and provided to the end user at the labeling site. In the subsequent labeling process, the roll is fed into a coating station which applies a thin (3 gsm to 15 gsm) coating of a hot melt or a warm melt PSA (which could optionally be UV curable) to the face stock material. If it is a UV curable adhesive, it may be rapidly and partially (or completely) cured by a low dose of UV as it exits the coating station and is then fed directly to the singulating station. However, with choice of the right hot melt or warm melt adhesive (with the desired adhesion performance), no curing is necessary. In one embodiment, after the coating of the adhesive, no drying is needed. The adhesive coated face stock is directly passed on to the singulating station without any drying process. In another embodiment, after the coating of the adhesive, no drying and no curing are conducted. The adhesive coated face stock is directly passed on to the singulating station without any drying or curing process.

At the singulating station and the dispensing station (or a combined dispensing station without a separate singulating station), the labels are singulated by breaking the lines of weakness, which were created during the printing process at the manufacturing site and are then applied to products in a continuous fashion.

While specific process steps are described in association with the example process above, embodiments of the present disclosure are not limited thereto. For example, the face stock material may not be perforated at the manufacturing site, an adhesive other than UV curable hot melt or warm melt adhesives may be utilized, other suitable energy-activated, rapidly curable adhesives or non-curable adhesives may be utilized, and/or part or all of the printing may be done during the labeling process. While a label face stock with a plurality of individual labels aligned in a single lane has been described, embodiments of the present disclosure are not limited thereto. For example, the face stock may include multiple lanes of labels, e.g., 2 lanes of labels. At the singulating station, each lane of labels may be singulated by a separate tool and applied to a separate line of products (e.g., each line of products is transported by a separate conveying system), or a single tool may be utilized to singulate the multiple lane of labels and apply them to the same line of products (e.g. all of the products are transported by the same conveying system).

According to embodiments of the present disclosure, the labels are coated with the adhesive as part of the same process in which they are dispensed and applied to products. This process is continuous and can be readily incorporated into the existing (related art) dispensing schemes. In principle any adhesive that (a) can be coated at temperatures from about 60 to 170° C. and (b) requires either no further conditioning or very small amounts of energy curing, can be utilized. These adhesives may be thermoplastic elastomer based or acrylic based adhesives or blends or hybrids of the two requiring no curing or self-curing, or which can be cured utilizing an external energy source such as UV. The coating temperature range may be wider but is limited by the ability of the coated substrate to withstand the temperature without distortion.

In one embodiment, adhesives that require energy to cure but may be cured with very little energy to provide suitable adhesion performance at very low coat weight may be utilized. In one embodiment, adhesives, which are formulated without any photo-initiators, thus lowering the cost, and are not cured after the coating, perform well in a range of applications.

According to an embodiment of the present disclosure, the adhesive is applied, or the coating is applied which becomes an adhesive, in the same continuous process, with a continuous web of label stock, in which the label is dispensed and applied to a container. Thus, at the labeling process (e.g., the point of dispensing), the label material (typically printed) is unwound, moved through the coating head, cured (cross-linked) if needed by a simple UV system, and then advanced to the singulating station where the web is separated into single labels (singulated), which are then applied to the product. A key requirement in this process is that, following the coating, the adhesive must be ready for usage in a short period of time (for example, in less than 10 seconds, or in less than 3 seconds) and requires little or no processing (curing) during this time so that the process remains compact and inexpensive to operate.

In one embodiment, an adhesive of a relatively low molecular weight may be selected, allowing it to be uniformly coated at a low coat weight. The adhesive may not require any curing and can be utilized as a label adhesive immediately. Unlike related art PSA labels, the adhesive coated roll is not wound up (as the coated web is utilized immediately). Therefore, in the labeling process according to embodiments of the present disclosure, there are no issues associated with the related art label rolls where the adhesive has to be of sufficiently high molecular weight to resist the forces that the adhesive layer experiences in the roll form which causes it to flow and leads to edge ooze and blocking. To achieve the required molecular weights, related art processing demands significant curing (cross-linking). In the process according to embodiments of the present disclosure, little or no curing is required. In one embodiment, the labels have been perforated so singulation occurs by effectively tearing the perforations at the dispensing point. However, singulation may occur by utilizing a variety of cutting methods at the dispensing point such as a laser or a flying knife (both with and without pre-perforations). Another label singulating method is to die cut or laser cut labels against a moving vacuum anvil (commonly a drum) which, after cutting, carries labels to the application point.

According to an embodiment of the present disclosure, an example label manufacturing process to provide a clear filmic label on a product may begin at the manufacturing site by the printing of a roll of face stock material (paper or film), as is done today with related art labeling, with information and advertising that will be placed on the products to be labeled. During the same process (on the same site), but after the printing, each label is weakened around its periphery by perforating with a rotating die. The roll of printed material, which carries the weakened labels, is then slit to provides a single lane of labels. This slit roll is then shipped off the manufacturing site and provided to the end user to be utilized at the client's site (i.e., the labeling site).

Figure 7:
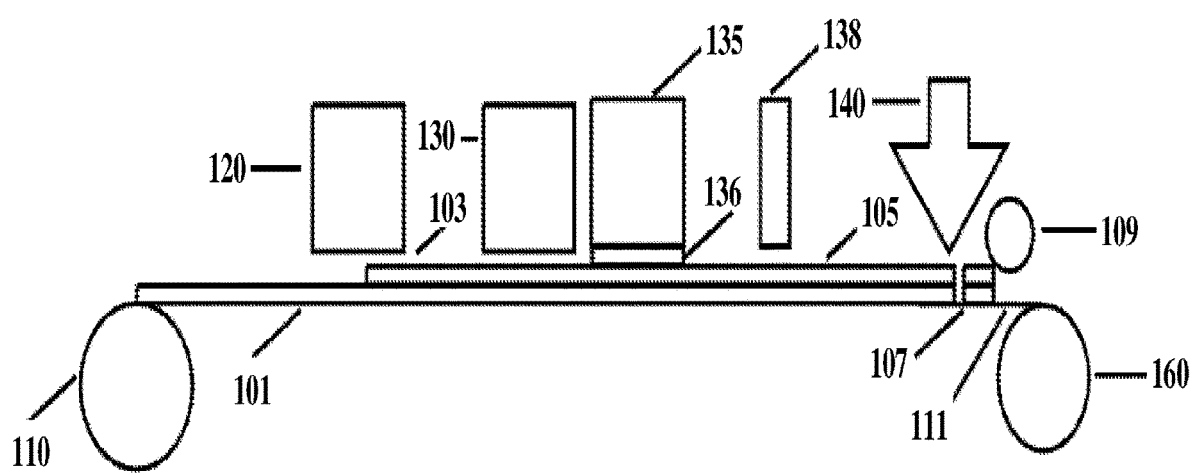
FIG. 7 is a schematic illustration of an example labeling process at the client's site.

FIG. 7 is a schematic illustration of another labelling process according to an embodiment of the present disclosure. In FIG. 7, the same reference numerals are utilized as in FIG. 1 to indicate similar process and materials, and the description thereof is not repeated again. Referring to FIG. 7, a roll of face stock 101 including a plurality of labels 101a is unwound at unwinding station 110. The face stock 101 passes through a coating station 120 and an adhesive layer 103 is coated on the face stock 101. The adhesive may be optionally cured at the curing station 130. The web is pulled through the coating station 120 by a driven roll or belt 136 at a transportation station 135 at a constant speed. Where a belt 136 is utilized, the belt has a low surface energy and is in contact with the adhesive. The web then passes through an accumulator 138 which takes up any slack in the web resulting perturbations in the web speed downstream in the singulating and dispensing stations. The web may be optionally rotated 90° and reaches the singulating station 140. After the individual label 107 is singulated (i.e., picked out of the web) and applied onto the product 109, any leftover matrix 111 is wound up at the winding station 160. In other embodiments the belt 136 may be a friction belt which contacts the face stock 101.

While die coating and a continuous coating layer have been described in the example process described above, embodiments of the present disclosure are not limited thereto. For example, spraying or screen printing of the adhesive may be utilized, instead of the continuous coating, for applications where the final appearance of the adhesive is not important. In another embodiment, the adhesive may be pattern coated, utilizing a suitable coating die, for applications where the final appearance of the adhesive is not important. In both of these cases the amount of adhesive required to produce a finished label is reduced. For example, the adhesive may cover about 30% to about 90% of the surface area of the label. Singulation may be affected by removing a label from a pre-weakened web but can also be affected by cutting with a laser, a knife or a die. It should also be noted that where one or more transportation stations (transportation systems) are utilized immediately after the coating station, the transportation system (e.g., the belt) may be in contact with the web from either the adhesive side or from the non-coated side opposite to the adhesive side.

According to another embodiment, a printed and slit roll of face stock material provided to an end user is coated with an adhesive, cut or perforated in order to enable the singulation (separation of a single label from the web) and applied to the products to be labeled in a continuous fashion. The web may be perforated before the adhesive coating and followed by adhesive coating, singulating and applying. During the singulating act, which may be conducted with a cutting die or a laser beam, the corners of the labels may be rounded to enhance the aesthetics of the label. When the web speed at either the singulation or application station is variable (i.e., the web is changing speed at different stations) then an accumulator located after the coating station may be utilized to smooth out any variations in web speed arising from the either the singulating or application act, so as to ensure that the coating speed is constant.

An indicia printing station in line on the web after unwinding and prior to the adhesive coating may be included in the labeling process. In early deployments, an end user may want the ability, for example, to add some simple variable printing, such as a name or customized indicia, to each label in addition to the earlier printing performed at the manufacturing site.

In one embodiment, the whole label may be printed in line with the coating and singulating stations. This would allow the end-user to create labels from a starting web of material, either from a perforated roll with weakened areas around the label area, or, where die cutting is done fully at the singulating station, from a simple (e.g., blank) roll of film or paper. Printing fully in line may allow the end-user to fully customize every label and eliminate expensive inventory.

Figure 8:
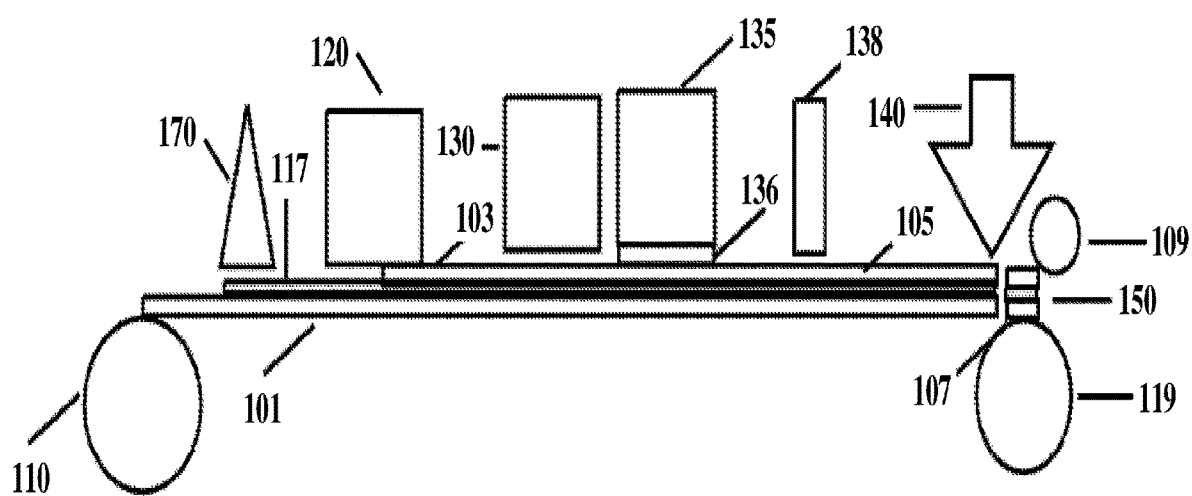
FIG. 8 is a schematic illustration of a process including the inline printing.

FIG. 8 is a schematic illustration of a process including the inline printing. Referring to FIG. 8, a roll of blank (i.e., non-printed) face stock 101 without any indicia printed thereon is unwound at the unwinding station 110 and pulled to a printing station 170 by the transportation system 135. At the printing station 170, an ink layer 117, representing an indicia such as the information about the product and graphical presentation, is printed on the face stock 101, utilizing, for example, a high-speed digital printer. The printed face stock is then moved to the coating station 120, and optional curing station 130. The printed and coated web then advances to the singulating station 140, via an accumulator 138, before an individual label 107 is applied to the product 109. In one embodiment, the labeling process may further include a rotating anvil 119 where individual labels are cut out of the web utilizing a cutting die.

While the printing station 170 is illustrated in a process including a curing station 130 and a rotating anvil 119, embodiments of the present disclosure are not limited thereto, and various suitable combinations of the process stations may be utilized and some of the process stations may not be included, such as the curing station 130 and/or the rotating anvil 119. Further, while the ink layer 117 and the adhesive layer 103 have been shown to be on the same side of the face stock 101, embodiments of the present disclosure are not limited thereto, and the ink layer 117 and the adhesive layer 103 may be positioned on opposite sides of the face stock 101. For example, the ink layer 117 may be applied to the top surface of the face stock 101, and the adhesive layer 103 may be applied to the bottom surface of the face stock 101.

Figure 10:
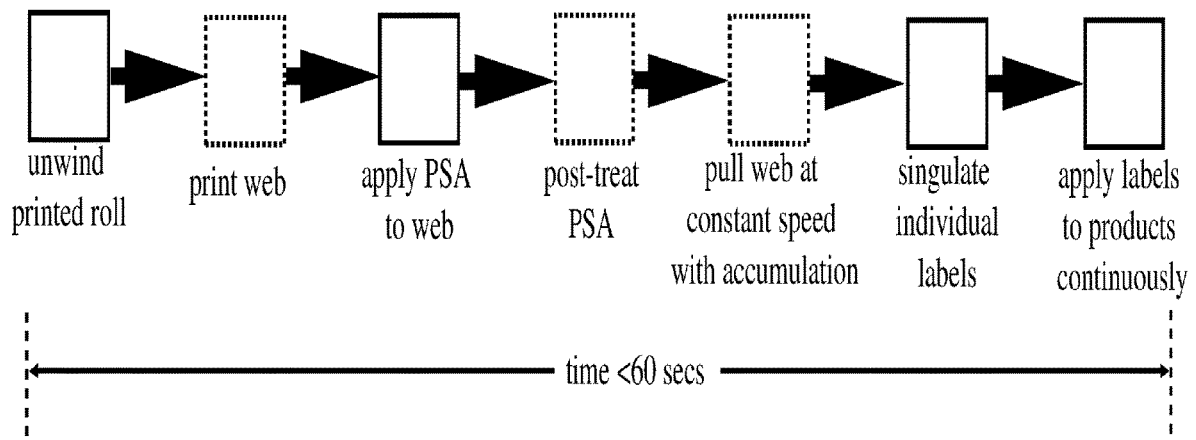
FIG. 10 is a schematic illustration of a labeling process.

FIG. 10 is a schematic illustration of a labeling process. Referring to FIG. 10, according to an embodiment, it takes less than 60 seconds for an individual label from the roll of face stock (e.g., a printed or unprinted roll of film or paper) to travel through the unwinding station, the printing station (optional, may or may not be included), the coating station, the curing station (optional, may or may not be included), the accumulation station (optional, may or may not be included), the singulating station, and to the completion of the applying of the label. In another embodiment, it takes less than 30 seconds for an individual label from the roll of face stock (e.g., a printed or unprinted roll of film or paper) to travel through the unwinding station to the completion of the applying of the label.

In a related art labeling process, a label includes a face stock, an adhesive layer under the face stock, a release system in contact with the adhesive, and a liner under the release system. The face stock is printed with an indicia (commonly describing and advertising the product to be labeled). This printing is typically done on a continuous (roll-to-roll) press producing many labels across and down the web of the label stock. The upper parts (face stock and adhesive layer) of the label-stock are then die-cut, to produce individual labels, which are still carried in roll form and supported by the liner. Typically, but not necessarily, the die-cutting is performed on the same asset as that utilized to print the labels.

The printed die-cut label stock is then slit to provide a single lane of labels and these slit rolls are then sent to an end-user who will put the labels onto products via a dispensing process. Labeling occurs at the end-user by feeding the die-cut label stock to a dispensing machine wherein labels are removed one-at-a-time from the liner and applied to the products to be labeled. The release system allows the adhesive-backed labels to be removed easily from the liner. This is typically a continuous operation running at high speeds (30-600+ labels/min) in which the to-be-labeled products are presented continuously to the dispensing point where they are labeled.

The residual liner, coated with the release system, becomes a waste stream. This waste stream is collected on a rewind stand following dispensing and may subsequently be land-filled or sold into low value reprocessing.

The above related art process has existed for more than 50 years, and whilst there has been continuous effort to improve this process (with, for example, the attempt to utilize thinner face and thinner liner materials, and lower coat weights for the adhesive and release system, etc.) the basic construction has remained unchanged. Over this time frame, the industry has developed enormous scale with the adhesive coated often onto a wide web (often 2-3 meters in width) of release coated liner (film or paper) at very high speeds (often well in excess of 1000 m/min). The adhesive, coated on this release coated liner, is laminated to the face (film or paper) web in the same process, forming the label stock. Most labels are manufactured this way through what is commonly known as the transfer coating process. The adhesive can be also directly coated on to the face material, followed by laminating with the release coated liner, commonly known as the direct coating process. For most of this time, the industry has sought to find ways to affect labeling of PSA-type materials without utilizing a liner and the associated release system, thus significantly improving material and supply chain efficiencies, reducing cost and eliminating an increasingly problematic waste stream.

Typically, approaches to linerless solutions have fallen into one of two broad categories: "Liner-free Labels" and "Activatable Labels".

Liner-free Labels, while eliminating the liner, retain the release system, and thus do not deliver the full cost potential of a true linerless solution. This approach typically begins with the printing of the face stock and then applying a release system to the printed face stock before coating the reverse side with an adhesive to create a self-wound label stock that does not have the liner. Typically, the self-wound stock is produced on a narrow web press utilizing an expensive adhesive, often a UV-cured hot melt, at a speed considerably lower (<<1000 m/min) than that utilized in related art adhesive coating. The cost accumulation of lower scale, higher cost adhesive and the continued usage of a release system mean that a portion, and sometimes all, of the cost benefit relative to the traditional process, of eliminating the liner is lost. It should be noted that the adhesive needs to have high enough modulus to reduce or prevent flow under the pressures it experiences in the roll as the label stock moves through the supply chain and the subsequent dispensing process. For this modulus to be attained, the adhesive needs to be cured (i.e. crosslinked). If the adhesive is not cured it will flow under the roll pressure, leading to both contamination on the edges of the labels (due to edge ooze), affecting the aesthetics, as well as issues with unwinding of the roll at high speeds (during dispensing), since this ooze tends to make the roll blocky. This need for higher crosslinking (via curing) necessitates the usage of higher adhesive coat weights to get the required tack and adhesion to the target surfaces, and thereby drives the cost up further.

A further challenge facing this approach is to create individual labels from the label stock (throughout this description, also referred to as "singulation") at the point of dispensing by the end-user. Since there is no liner to carry the pre-die cut labels to the dispensing point, singulation can only occur at the point of dispensing. One approach to this challenge is to utilize a re-usable liner at the dispensing point. This allows a label to be die cut from and the web, singulated, and to subsequently be carried to the dispensing head by the temporary liner. The reusable liner reduces the cost benefit of the solution (since a liner is re-introduced) and adds complexity to the process. Another approach to solving the dispensing problem of a liner-free adhesive system utilizes labels that are 'weakened' within the web prior to dispensing. In this scheme, the surrounds of labels within the web are weakened by slits or perforations. This 'weakening' is typically done on the printing press (and would replace traditional die-cutting) so that the weakened self-wound material can be provided to the end-user in a ready to use state. The line of weakening for each label includes at least one aperture which provides for engagement by a tool, which at the time of dispensing can be utilized to break the weakened area and thus separate the leading label in the web and allow it to be applied to a product. In this scheme, the self-wound web carries the label to the dispensing point, but labels are easily removed from the web. Whilst such schemes solve the dispensing challenge, they have seen limited adoption because the limited cost benefit of the total solution does not justify the additional complexity of dispensing.

Activatable Labels involve applying a specialty coating or cover layer to the adhesive system (essentially replacing the liner and the release system) or having an adhesive system which is non-tacky at room temperature. In these solutions a separate process, just prior to labeling, either removes the coating/cover layer to 'unmask' the adhesive or activates the adhesives through an external stimulus such as heat or liquid. Activatable labels are supplied to the end user in a non-tacky state, and then the labels are activated, i.e., the label's adhesive is exposed (activated) to its tacky state just prior to application to the intended product. Obviously activatable labels are printed prior to activation. Well described schemes include the use of ultraviolet ("UV") energy to heat the adhesive, corona treatment to activate the surface, radiant heat to warm the adhesive, moisture to activate a rewettable adhesive, microencapsulating an activator material, which can then be crushed to allow the activator to mix with the rest of the formulation and activate the adhesive, overcoating the adhesive with a de-tackifier layer, which is later removed by heat or mechanical means, and ultrasound energy to activate the adhesive.

By far, the most common activation scheme utilizes heat activation, involving such schemes as the removal of a protective coating or activating of the label adhesive utilizing heat. For heat activating the adhesive, various techniques have been proposed. The adhesive remains tacky for a short time defined as the open time of between 0.2 and 10 seconds within which the adhesive has to be applied to the container. In addition, general methods for heating utilizing radio frequency ("RF") energy, inductive heat, radiant heat, and visible light also are well known and could be applied to this list of activation methods. These techniques may have some utility for low-speed operations, but as application speeds increase for high speed labeling, these methods all suffer in that the exposure times of the labels to the heating elements must somehow be increased in order to gain sufficient heating. The size, and the concurrent cost, of the units capable of supplying sufficient heating has thwarted high-speed applications.

While all of the above related art activatable label schemes do indeed eliminate the liner and the release system, and, therefore, a waste stream, they replace them with another, often relatively expensive material, add complexity and again do not meaningfully improve cost. The cost issues arise both from the use of often expensive components in a specialty coating which masks the adhesive or expensive additives/process to create a non-tacky adhesive. Further the requirement for additional process assets to remove the coating or activate the adhesive also adds cost to the overall solution. Finally, singulating the labels at the point of dispensing remains challenging (without a carrier web as described previously). As discussed, related art approaches to singulating at the dispensing point exist but add complexity and the cost of proposed activatable label solutions do not justify end-users engaging in this additional complexity.

Finally, it should be noted that due to the generally complex formulations needed to render an activatable adhesive non-tacky the final adhesive after activation is commonly hazy. If the adhesive is hazy then a meaningful part of the label market, the so-called 'clear-on-clear' label, cannot be addressed. For clear-on-clear a clear printed film with a clear adhesive is applied to a product and only the print is evident allowing a consumer to see product beneath the label. If the adhesive is hazy then the appearance is unacceptable.

The labeling process according to embodiments of the present disclosure offers a number of enhancements over related art PSA labeling. First, it eliminates the need for a liner and release system. This has significant cost and environmental benefits. Unlike other approaches, the eliminated materials are not replaced with another material. The usage of a hot melt or warm melt adhesive, e.g., at low coat weights, provides material cost savings whilst offering the desired adhesive performance. A small adhesive coating unit (e.g., for coating on a web including only a single pane of labels, in contrast to coating on a wide web including multiple panes of labels) is included in the labeling system (i.e., the novel coating and dispensing system). The cost of the coating unit will be amortized over many years of running and many thousands of labels and does not materially add to the total cost of the solution. In addition, this coating unit replaces the large coating asset utilized in the traditional PSA labeling process.

The labeling process and system according to embodiments of the present disclosure also offer the ability to dramatically simplify the supply chain. In deployments where the printing is done at a separate site from the end-user, the need for an adhesive coater and a liner manufacturer is eliminated (essentially taking two steps out of the value chain). In deployments where the printing is done fully by the end-user in-line with the dispensing, the printer is removed from the supply chain. These improvements offer efficiency and cost benefits and, additionally, offer the end-user tremendous flexibility in their supply chain and the ability to customize the labels.

Another approach to high speed labeling, but not utilizing a PSA, is a system called "Cut and Stack". This labeling system is primarily for paper labels and involves the following typical steps: first, the paper face stock is printed with labels, typically on a roll-to-roll press. The labels are die cut from the printed face stock and stacked in a magazine. It should be noted that the shapes of labels are typically confined to square or rectangular shapes. Typically, this die cutting and stacking occurs at the end of the printing press. The stacked labels are then delivered to an end-user who loads the magazine of labels into a feed system from which individual labels are taken and wiped with a water-based glue. The glue wiped labels are then transported to a dispensing point where they are applied to products.

The cut and stack process is commonly utilized in high volume applications and provides an inexpensive form of paper labeling. However, the system is only useful for paper labels. For filmic labels, the quality is not sufficient, especially when a clear label appearance is needed, i.e., clear-on-clear applications. Further, it is difficult to effectively dry the water-based adhesive with a filmic face stock.

The labeling system according to embodiments of the present disclosure offers a cost-effective alternative to cut and stack and enables the usage of filmic face stock. Similar to cut and stack, the labeling system according to embodiments of the present disclosure utilizes only a printed face stock and an adhesive. However, the system according to embodiments of the present disclosure utilizes a high performance, clear and non-aqueous based adhesive (which requires no drying). Such adhesive is suitable to label both paper and filmic face materials and provides a much high-quality final appearance. The warm/hot melt adhesive also provides water resistance, water whitening resistance and water bath immersion resistance, which is essential for clear labels on bottles submerged in ice chests. In some embodiments, the substrate is a plastic film and the entire laminate remains clear after exposure to heat to tackify the detack layer, thereby forming a clear label providing a no-label look to a product to which the clear label is applied. These square or rectangular filmic labels may be die cut and stacked in a magazine. In one embodiment, the cutting and stacking is performed in a manner similar to conventional cut and stack labels. In another embodiment, instead of a wet glue, the labeling system has a detackified PSA that is activated just prior to application to a bottle. In another embodiment, there is no need to perforate the film since the die cutting is carried out after the PSA is coated and the detack layer applied over the PSA. In another embodiment, the face stock can be paper with a detackified adhesive on one side and the print layer on the other side. These paper labels can be die cut, stacked and activated prior to application just as the filmic cut and stack detackified labels.

According to an embodiment of the present disclosure, a pressure sensitive adhesive label consists of a face stock; an indicia on the face stock; and a pressure sensitive adhesive on the face stock, wherein the pressure sensitive adhesive has a coat weight of about 3 gsm to about 20 gsm, and a 180° peel of about 1 N/inch to about 20 N/inch.

Any PSA that does not exhibit edge ooze and is used for making a coated film or paper roll label stock can be used. In an embodiment of the invention, the detack layer has the following properties. (i) it covers the PSA layer and renders the surface non tacky to touch, (ii) it does not migrate or get completely pushed into the PSA layer under the conditions of roll storage and transport of about 15-50 psi pressure and temperatures of about 50° C., (iii) it allows the roll to be wound and unwound without blocking, (iv) it is readily converted to tacky material under the influence of an external heat source in less than 4 seconds and preferably less than 1 second in order to bond to a product at high web speeds i.e. dispensing web speeds of about 150 fpm, (v) it does not alter the clarity or aesthetics of the label, (vi) it forms a strong bond to the product i.e. not substantially detract from the adhesion of the PSA to the product, (vii) it is compatible with the PSA and (viii) it does not change the aesthetics and clarity of the label after long term aging on the product through crystallization or incompatibility or other means.

In another embodiment, the detack layer does not have all the properties from those listed in (i) to (viii) above. Having some of the properties listed in (i) to (viii) above may be sufficient to function as a detack layer. Such a detack layer does not need to be removed or sublimed using external stimuli or processes. With thermal radiation or NIR, such a detack material of an embodiment of the invention becomes tacky, and mixes with the PSA without substantially changing the PSA properties or the clarity. With paper labels or opaque or translucent filmic labels, properties (v) and (vii) are not essential since the consumer will not be able to see the adhesive through the label stock. Any material that has all or some of the above properties can be used as a detack material. Examples of such detack materials include commercially available or laboratory synthesized tackifiers, plasticizers, a tackifier or a plasticizer with or without other materials, combination of a tackifier with a plasticizer with or without other materials, combinations of several tackifiers by themselves or with other materials, several plasticizers by themselves or with other materials or combinations of several tackifiers with several plasticizers with each other or with other materials, other materials other than tackifiers or plasticizers that have some of the properties listed above and combinations thereof.

In one embodiment, a blend of a solid plasticizer and solid tackifier in the ratio 75:25 to 25:75 by weight is used as the detack layer on the surface of the PSA which becomes tacky when exposed to heat. The materials and the blend ratio are chosen to be compatible with the PSA. The clarity and the adhesive properties of the resulting PSA with the blend of the plasticizer/tackifier combination is hereby defined as an indication of compatibility. For clear film label applications, the compatibility needs to be high enough so that the label retains the clarity and the no label look initially and after extended periods of being on the container. For paper and non-clear filmic label applications, it is acceptable for limited compatibility as noticed by slight hazing or whitening as the adhesive is not visible to the consumer. However, in both clear and paper label cases, the compatibility has to be good enough to not compromise the adhesive properties. Further definition of the compatibility of polymer blends as defined by the solubility parameters of the individual components can be found in literature, such as in the Handbook of Pressure Sensitive Adhesive Technology, Second Edition, Edited by Donatas Satas, Van Nostrand Reinhold, N Y, 1989.

The role of a plasticizer compatible with the PSA is to lower the glass transition temperature (Tg) of the PSA and to lower the modulus. The role of a tackier compatible with the PSA is to raise the Tg of the PSA and to lower the modulus. By using such a blend of the solid tackifier and solid plasticizer as the detack layer, on melting and becoming compatible with the PSA, the Tg of the PSA is not raised or lowered substantially, and hence adhesive properties are not substantially changed and in fact maintained or slightly improved. In one embodiment, the Tg of the PSA blend is within ±10% of the Tg of the PSA. In another embodiment, the Tg of the PSA blend is within ±25% of the Tg of the PSA. Also, since both the tackifier and plasticizer lower the modulus, the wet-out behavior of the PSA on the containers (such as glass or plastics or any other substrate) is maintained and/or improved and also the PSA properties are maintained and/or improved. In yet another embodiment, a blend of the solid plasticizer and solid tackifier in the ratio 98:2 to 2:98 by weight is used as the detack layer on the surface of the PSA wherein the detack layer becomes tacky when exposed to heat. In some embodiments, the detack layer may have limited compatibility with the PSA as evidenced by slightly hazy or unclear film of the blend used for applications where clarity of the label does not matter or for paper or filmic labels that are opaque or translucent. In some embodiments, the Tg of the PSA blend could be substantially higher or lower than the Tg of the PSA.

Any material or combination of materials that meet the above requirements is suitable as a detack material. In some embodiments, materials are solid plasticizers such as Uniplex 260, 512, 552, 280 CG made and supplied by Lanxess Corporation. These are benzoate esters having relatively sharp melting points and can be readily melted by IR or thermal radiation. Uniplex 260 (glyceryl benzoate) has melting point (MP) of 70-73° C., Uniplex 512 (neopentyl glycol dibenzoate) has MP of 49° C., Uniplex 552 (pentaerithrytol tetrabenzoate) has MP of 100° C., and Uniplex 280 CG (sucrose benzoate) has MP of 93° C. These materials are also relatively compatible with several acrylic PSA compositions. These plasticizers can be further compounded with ingredients such as Carbon black to enhance IR susceptibility, additives to increase the modulus and resistance to blocking and modify the rheology such as fumed silica (Evonik Aerosil® 200, R 202 or R 805), ingredients to prevent the plasticizers from crystallizing and affecting the clarity such as solid tackifiers (Eastman Foral™ 85 E), other additives to modify viscosity, improve tack on activation, etc. These materials can be used by themselves with the plasticizers or in combinations or with other ingredients. In one embodiment, the detack layer may be made of only the tackifier. In another embodiment, the detack layer may be made of only the plasticizer. In yet another embodiment, the detack layer may be made of combinations of a plasticizer and a tackifier in ratios to render the composition clear and tacky after subjecting it to heat or NIR radiation. In another embodiment, the tackifier or the plasticizer either alone or in combination may be combined with other ingredients to form a mixture comprising the detack material that keeps the detack material clear and tacky after subjecting to heat or NIR radiation. These additional ingredients can further add other features such as NIR susceptibility, besides enhancing compatibility.

The detack layer can be applied onto the adhesive surface in a number of ways. In some embodiments, the detack layer can be a continuous or a discontinuous layer on the surface of the PSA layer. When discontinuous, in some embodiments, the detack layer covers at least 60% of the surface of the PSA. In other embodiments, the detack layer is discontinuous and covers at least 50% of the surface of the PSA layer. In some other embodiments, the detack layer is discontinuous and covers at least 40% of the surface of the PSA layer. In some embodiments, the detack layer is discontinuous and covers at least 30% of the surface of the PSA layer. In one embodiment, the detack layer could be coated onto the PSA surface by using conventional coating techniques such as roll coating, die coating etc. A coat weight of about 3 gsm to up to about 25 gsm could be used.

In another embodiment, the detack material could be sprayed onto the PSA surface by melting the blend of plasticizer/tackifier/rheology modifier and/or other ingredient/s or additives and then spraying it onto the PSA surface using a sprayer such as a Nordson Universal™ spray nozzle system. The spraying can be done in such a way that the detack material does not solidify or partially solidifies or completely solidifies before reaching the PSA surface. The melt rheology and the surface tension of the detack material can be regulated and spray conditions chosen to get a thin continuous layer of the detack material on the surface of the adhesive, or a discontinuous layer can be obtained. In yet another embodiment, the detack layer could be deposited on the PSA surface by contact printing techniques such as screen printing or non-contact techniques such as ink-jet printing. The detack material could also be deposited on the PSA surface by sprinkling or dusting or depositing a layer of powder onto the surface through a number of ways such as spraying, sprinkling, electrostatic deposition etc.

In one embodiment, the detack material is added in a continuous process by spraying the detack material onto the adhesive-coated web which is transported at a speed below the spray outlet. In one embodiment, spraying is performed using a standard powder spray approach in which the powder is fluidized and pumped through a spray nozzle to create a spray of powder which is deposited on the adhesive web as it passes under the spray head. The operation is conducted in a confined 'booth' so that overspray is contained. In one embodiment, the overspray is recovered and may be used again. The amount of powder deposited on the web is controlled by the rate at which spray is ejected from the nozzle and the speed at which the web is traveling. In one embodiment, the amount of powder deposited on the web and measured in grams per square meter (gsm) is in the range 2 gsm to 40 gsm. In another embodiment, the amount of powder deposited is greater than 40 gsm. In one embodiment, particle size distribution of the detack powder is in range from 0.01μ to 500μ. In another embodiment, the detack powder particle size distribution is in range from 1μ to 200μ. In yet another embodiment, the detack powder particle size distribution is in range from 1μ to 100μ. In one embodiment, for wide adhesive webs, a bank of spray heads may be used. In another embodiment, the powder may be sprayed shortly after adhesive coating of the web. In another embodiment, the powder may be sprayed immediately before the web is rewound. In another embodiment, the powder is sprayed at a suitable point between adhesive coating of the web and rewinding of the web.

In one embodiment, the detack and the PSA layers may be coated in a single coating step as dual layers. In another embodiment the detack layer is deposited on the surface of the PSA either before or after the PSA is cured or crosslinked. In one embodiment, the filmic facestock may be printed with the graphics and/or product information, the PSA coated or sprayed on the non-printed side of the facestock, followed by curing the PSA and the deposition (spraying, sprinkling, dusting, sieving or coating) of the detack layer on top of the PSA. In another embodiment, the detack layer may be placed on the PSA using transfer lamination or printing. In another embodiment, the filmic facestock may be printed with the graphics and/or product information, the PSA coated or sprayed on the non-printed side of the facestock, followed by the deposition (spraying, sprinkling, dusting, sieving or coating) of the detack layer on top of the PSA. The coating of the PSA and deposition of the detack layer can also be done in a single step using a dual layer coating technique. In one embodiment, a roll of facestock coated as above is weakened either at the beginning of any of the above steps, or after any of the above steps or at the end of all step. In another embodiment, the facestock is then slit to the desired width and then rolled up to ship to the customer who will be labeling the container.

In some embodiments, a pressure sensitive label laminate comprises a face stock, a PSA and a detack layer (DL) wherein the DL is applied to the PSA either in line or via secondary process, whereby the DL forms a continuous solid layer. In another embodiment, DL forms a discontinuous layer. The DL allows the resulting laminate to be rolled and unrolled freely. The DL, upon application of heat, melts in less than 2 seconds. In one embodiment, DL melts in less than 1 second. The PSA label with the molten DL on the surface is tacky and can be applied instantaneously to a container. The molten DL forms a tacky layer that is compatible with the PSA allowing further rapid development of tack, the tack being sufficient to apply the laminate to a moving object. In one embodiment, the DL layer, as it mixes with the PSA over time, has no deleterious effects on the tack and/or the clarity of the PSA. The coat weight of the PSA can range from about 5 gsm to about 25 gsm, most preferably from about 8 gsm to about 15 gsm. In some cases, the coat weight of the PSA may be as high as 50 gsm.

In another embodiment, print and apply applications are carried out wherein the roll of detackified label laminate passes across a heat source after printing. The roll is then cut to singulate and label applied using light pressure. In one embodiment, a vacuum belt is used to apply the label. In another embodiment, the labels are singulated first and then heat activated followed by application of the label.

In some embodiments, a blend of a plasticizer and a tackifier is used in the ratio 75:25 to 25:75 by weight. This ratio of the materials becomes tacky and clear when exposed to heat. In one embodiment the heat exposure is at temperatures above about 85° C. In another embodiment the heat exposure is at temperatures above about 50° C. The blend of plasticizer and tackifier and other additives such as rheology modifiers, IR susceptors and such is chosen to be compatible with the PSA. The DL comprises a blend of the plasticizer, and tackifier, and other additives if used. Having the PSA and the DL (herein "PSA blend") formed from migration of plasticizer and tackifier and additives into the PSA, wherein the plasticizer to tackifier composition is in the ratio 75:25 to 25:75 prevents the plasticizer from crystallizing and affecting the clarity of the final PSA blend. If the plasticizer or the tackifier is used alone, the final PSA/plasticizer or PSA/tackifier blend leads to whitening with time affecting the clarity of the label. The clarity is essential for clear labels which are applied on containers to enable a no label look. However, for paper labels or opaque filmic labels, clarity is not a critical feature.

The role of plasticizer is to lower Tg of the PSA and lower the modulus. The role of tackier is to raise Tg of the PSA and lower modulus. By using a PSA blend of a plasticizer and a tackifier, the Tg is not raised or lowered substantially. Any raising or lowering of Tg depends on the blend ratio. In some embodiments, the adhesive properties of the PSA blend are not changed and maintained at about pre-blend PSA adhesion properties. In another embodiment, the adhesive properties of the PSA blend are enhanced over the PSA properties, leading to stronger and longer lasting adhesive bonds. Also, the modulus of the PSA blend is not substantially raised, thereby maintaining PSA properties and providing wet out onto the container over time similar to PSA. In one embodiment, the adhesive performance of the PSA is enhanced. The coat weight of the detack layer can range from about 2 gsm to about 20 gsm, most preferably from about 6 gsm to about 13 gsm. In some embodiments, the ratio of DL to PSA layer can range from about 9% of DL to 91% of PSA layer by weight (at a DL cwt of 3 gsm and PSA coat weight of 30 gsm) and about 67% DL and 33% PSA layer (at a DL cwt of 20 gsm and PSA cwt of 10 gsm). The percentage of the DL in the PSA blend can thus range from about 9% to about 67% by weight. The ranges for the DL percentages can be higher or lower if the coat weights of the PSA are lower or higher.

In some embodiments, the PSA layer to detack layer weight ratio is in the range of about 2:1 to about 10:1. In some embodiments, the PSA to detack layer weight ratio may be in the range from 1:5 to about 10:1. In other embodiments, the PSA to detack layer weight ratio may be in the range from 1:2 to 10:1. In yet another embodiment, the detack layer is on top of an adhesive layer which is not a PSA, and such non-PSA layer becomes a PSA when one or more of the constituents of the detack layer migrate into such non-PSA layer from the detack layer.

In one embodiment, the laminate of the invention comprises a non-PSA adhesive. In another embodiment, the detack layer is not removed by sublimation or dissolution using heat, solvent, or other processes. In yet another embodiment, the detack layer does not comprise materials that do not become tacky upon exposure to heat. In another embodiment, the function of the detack layer is to blend with the PSA upon exposure to heat to provide an adhesive surface having adhesion properties that are at least same or better than the PSA, and the function of the detack layer is not to simply expose the underlying PSA surface by migrating into the PSA upon application of heat. The detack layer become tacky upon exposure to heat or radiation, and the tacky detack layer begins to blend with the underlying PSA layer to form a PSA blend. Whereas the process of blending the tacky detack layer with the underling PSA layer begins soon after tackification of the detack layer, blending a substantial part of the detack layer with the PSA layer to form a PSA blend takes well over an hour. In another embodiment, blending a substantial part of the detack layer with the PSA layer to form a PSA blend takes about an hour.

In some embodiments a filmic or a paper substrate is coated with a conventional inherently tacky PSA. In another embodiment, the surface of the PSA is covered with a detack layer comprising (i) at least a tackifier or (ii) at least a plasticizer. In one embodiment, the surface of the PSA is covered with a detack layer comprising a mixture of at least a tackifier and a plasticizer, the tackifier/plasticizer ratio being in the range of about 25:75 to about 75:25 by weight. In another embodiment, the melting point of the detack layer mixture is at least 85° C. or higher. In one embodiment, the coverage of the PSA surface with the detack layer is at least 60% of the PSA surface. In another embodiment, the coverage of the PSA surface with the detack layer is at least 30% of the PSA surface. In another embodiment, the detack layer is in the form of discrete entities in the shape of spheroids, ellipsoids, filaments etc. In some embodiments, the coverage is achieved by spraying, sprinkling, sieving, dusting, printing or coating of the detack layer on the PSA surface. In one embodiment, coating of the detack layer on the PSA comprises powder coating. The surface of the paper or film that does not have the PSA, is free of any release material, thereby enabling printing by an indicia at any stage of the label making or dispensing process, wherein the filmic or paper substrate is pre-weakened or weakened in line during dispensing to enable singulating and dispensing of the labels without the need for a carrier release liner. In one embodiment, the detack layer is tackified using thermal or IR radiation with an exposure time of less than 3 seconds. In another embodiment, the PSA blend is rendered tacky and stays tacky for a period of at least an hour or longer after exposure to heat and/or radiation.

The long time for which the DL layer remains tacky after thermal (or IR or NIR) exposure allows the DL layer and the PSA blend to flow into the roughness and contours present on the surface of the container on which the label is applied enabling the air from these rough and contoured regions to be displaced. This air egress from the roughness and the contours allows the label to assume the "no label" look which is aesthetically desired for a number of applications where the label is desired to look like it is not a label but a part of the container. In one embodiment, the DL layer remains tacky for greater than 30 minutes. In another embodiment the DL layer remains tacky for about one hour. In another embodiment, the DL layer remains tacky for more than one hour. In some embodiments, the detack layer is tackifiable in less than 3 seconds upon exposure to a thermal or an infra-red radiation source and upon tackifying, the detack layer becomes and stays permanently tacky, begins blending with the PSA layer to form a PSA blend which also is permanently tacky.

In one embodiment, a laminate comprises a face stock and a PSA wherein the face stock is in contact with a first or a lower surface of the PSA. The second or the upper surface of the PSA comprises a plurality of filaments and/or ellipsoids sprayed on the upper surface of the PSA. The filaments and/or the ellipsoids are of different shapes, lengths and/or thicknesses disposed in a random distribution on top of the upper adhesive surface, and at least two of the plurality of filaments and/or ellipsoids partially overlap with one another. In some embodiments, the filaments and/or the ellipsoids are not ordered and comprise sprayed, printed, sprinkled, dusted and/or brushed materials applied onto the upper adhesive surface to provide randomized distribution of the filaments and/or the ellipsoids on the upper adhesive surface.

Friction Test

One inch wide sample of the laminate as made in Example 3, consisting of a film with the PSA coated on it, with or without detack layer was laid down on a stationary stainless steel panel. When the detack layer is present, the detack layer touches the stainless steel panel. A 200 gram weight was placed on top of the laminate, and the end of the laminate was attached to a Fish Scale AdiyZ portable electronic scale. The digital scale was pulled at a constant speed of 3.85 feet/min. with the laminate moving across the stainless-steel panel with the 200 gram weight on top of the tape. The frictional force of the detack/pressure sensitive adhesive layer moving across the stainless-steel panel with the 200 gram weight on the laminate is recorded in pounds (lb).

Detack Coat Weight Measurement

The coat weight of the detack layer on the pressure sensitive adhesive of Example 3 through 5 was measured gravimetrically by first measuring the weight of a 2 inch by 2 inch area of the pressure sensitive adhesive with the film and subtracting it from the total weight of the detack layer/pressure sensitive adhesive/film.

Detack Surface Coverage Measurement

A digital photo of the detackified pressure sensitive adhesive surface of Example 3 was taken using an Ablegrid 2 Megapixel USB digital microscope. The image was analyzed using an ImageJ analyzer, which is an NIH free-ware. The surface coverage was recorded as a percentage of the total area covered by the detack layer.

Blocking Test

A PSA covered with the detack powder of Examples 3 through 5 was cut to a desired size (0.3"×0.3" or a 0.42"× 0.42" square) and this covered surface was covered with a PET film, and the sandwich was placed in an oven at 50° C. with a 2 kg weight placed directly on top. This corresponds to a pressure of 48.9 psi in case of 0.3×0.3 square or 25 psi in case of 0.42×0.42" square. Sample was taken out after 7 days and checked for blocking between the PSA and the PET film.

180° Peel Test

A half inch or 1 inch strip of the PSA laminate as made in Example 3 was attached with the tacky surface next to glass panel and adhered to the panel by rolling back and forth with 2 kg rubber roller. After dwelling the laminate on the panel for a fixed time (0, 30 minutes or 1 hour), the 180° peel was measured using a Labthink XLB(B) Auto Tensile tester (Labthink Instruments Co. Ltd.) using a separation speed of 300 mm/min. The dwell time after lamination to the glass panel is typically 30 minutes unless otherwise specified in the example. An average of 3 to 5 specimens were tested and the average 180° Peel data is reported in N/inch width of the laminate (N/in).

The following Tables and Examples illustrate the performance of the adhesive on various surfaces.

Example 1

A hot melt adhesive from BASF, acResin® A250 UV was coated onto a release liner utilizing a slot die and UV cured at 0, 15 and 30 mJ/cm$^2$. After curing, it was laminated to either a 1 or 2 mil polyester film in order to test adhesion to glass, HDPE and stainless steel (SS) panels. The adhesive on the 1 or 2 mil PET film was laminated to the respective panel, rolled up and down with a 2 kg rubber roller and allowed to dwell on the panel for various periods of time listed in Table 1. The 180° Peel adhesion was measured utilizing a LabThink XLB(B) Auto Tensile Tester (LabThink Instruments Co. Ltd.) at a speed of 300 mm/min and peel values reported were from an average of 3 to 5 measurements.

Example 2

A sample was prepared substantially similar to the samples of Example 1, except that a Henkel UV curable adhesive UV 5321 was utilized instead of the acResin® A250 UV. The test data is shown in Table 2.

TABLE 1

| Example | Adhesive | Coat weight, gsm | UV Dosage, mJ/cm2 | Film | Glass panel, 180° Peel, N/inch | | | | HDPE panel, 180° Peel, N/inch | | SS panel, 180° Peel, N/inch | |
|---|---|---|---|---|---|---|---|---|---|---|---|---|
| | | | | | 30 min | 24 hr | 7 days | 38 days | 30 min | 19 days | 30 min | 21 days |
| 1.0 | BASF acResin A250 | 10 | 15 | 1 mil PET | 6.1 | 8.8 | 10.6 | | 4.5 | 4.42 | 10 | 10.94 |
| 1.1 | BASF acResin A250 | 10 | 30 | 1 mil PET | 6.3 | 11.6 | 10.4 | | 3.9 | 5.7 | 4.6 | 9 |
| 1.2 | BASF acResin A250/Foral 85E*, 90/10 | 10 | 30 | 1 mil PET | 7.5 | 9.4 | 11.2 | | 3.1 | 4.1 | 7.6 | 11.1 |
| 1.3 | BASF acResin A250 | 9.8 | 0 | 2 mil PET | 15.7 | | | | | | | |
| 1.4 | BASF acResin A250 | 9.8 | 15 | 2 mil PET | 4 | | | 9.1 | | | | |
| 1.5 | BASF acResin A250 | 9.8 | 30 | 2 mil PET | 10 | | | 15.3 | | | | |
| 1.6 | BASF acResin A250 | 13.6 | 0 | 2 mil PET | 14 | | | | | | | |
| 1.6 | BASF acResin A250 | 13.6 | 15 | 2 mil PET | 13 | | | 17 | | | | |
| 1.7 | BASF acResin A250 | 13.6 | 30 | 2 mil PET | 9.6 | | | 15.9 | | | | |

Foral™ 85E* is from Eastman and is utilized as a tackifier.

TABLE 2

| | Adhesive | | Glass, 180° Peel, N/inch | | |
|---|---|---|---|---|---|
| Example | Adhesive | Thickness, mil | UV dosage, mJ/cm2 | 30 min | 24 hours | 30 days |
| 2.1 | Henkel UV 5321 | 0.65 | 0 | 9.5 | 11.5 | 9.8 |
| 2.2 | Henkel UV 5321 | 0.65 | 6 | 2.8 | 8.54 | 8.2 |

A truly linerless labeling process and system which eliminate both the liner and the release system have been described. The labeling process applies the pressure sensitive adhesive in-line with the dispensing of the labels. Further, the printing of the label graphics, in whole or in part may be performed on the label stock in-line with the dispensing. A hot melt or warm melt adhesive or UV curable syrup (or other suitable energy-activated adhesive) is coated to a label face stock, and optionally rapidly cured before dispensing singulated labels onto the products (such as bottles or containers) in a single continuous process to achieve a low cost waste free system. The system eliminates both the liner and the release system, and offers significant supply chain benefits (as labels are created at point of use). The inventions described herein offer meaningful reductions in the amount of adhesive required (reducing the adhesive in some cases by more than 50%). Further the inventions allow also for meaningful reductions in the thickness of the face material. In addition, each material layer utilized in the label manufacturing and application process remain on the finally applied label, and no additional layers, which requires removal upon dispensing of the label (such as the liner and/or the release system), are ever present in the label and the process of manufacturing or application of the label. Taken altogether the invention results in a dramatic reduction on overall material usage and the consequent environmental footprint of PSA labeling. Example 3.1 and 3.2:

BASF acResin® A-250 was coated on a 1 mil PET pre-perforated facestock at 10 gsm coat weight and was UV cured at 30 mJ/cm2. This PSA surface was sprinkled with the Uniplex plasticizers listed in Tables 3.1 and 3.2. The sprinkling/dusting/depositing/sieving was carried out using a 75 μm mesh screen to get even surface coverage of the powder. The coat weight of the plasticizer was measured gravimetrically. The labels detackified with the plasticizers were heated on either a hot plate or using an IR lamp. The surface temperature of the PSA was measured using an IR thermometer. The label after exposure to thermal radiation was applied to a glass panel. The 180° peel was measured as in Example 1. The friction, surface coverage and detack coat weight of the label prior to thermal activation exposure were measured as per the test methods described in the specification. The clarity was visually measured. Although the labels with some of the plasticizers showed clear coatings at lower coat weights, at higher coat weights, crystallization leading to cloudiness was noticed not making them useful for clear label applications.

Table 3.1 and Table 3.2

TABLE 3.1

| Detack Layer | Example | Particle size μm | MP of plasticizer °C | Coat weight gsm | Surf. Temp °C | Surf. coverage % |
|---|---|---|---|---|---|---|
| No tackifier* PET alone, no PSA, no plasticizer | Ex 3 | | | 0 | | 0 |

TABLE 3.1-continued

| Detack Layer | Example | Particle size μm | MP of plasticizer ° C. | Coat weight gsm | Surf. Temp ° C. | Surf. coverage % |
|---|---|---|---|---|---|---|
| Uniplex 552* | Ex 3 | <75 | 100 | 1.9 | 110 | 67 |
|  |  |  |  | 2.3 |  |  |
|  |  |  |  | 6.1 |  |  |
| Uniplex 280 CG* | Ex 3 | <75 | 93 | 2.8 | 105 | 65 |
|  |  |  |  | 1.9 |  |  |
|  |  |  |  | 7.6 |  |  |
| Uniplex 260* | Ex 3 | <75 | 73 | 3.8 | 85 | 63 |
|  |  |  |  | 7.5 | 86 | 57 |
| Uniplex 512* | Ex 3 | <75 | 49 | 4.9 | 60 |  |
|  |  |  |  | 8.3 |  |  |
| 552/F85, 75/25 by weight | Ex 4 | <75 |  |  |  |  |
| 552/F85, 65/35 by weight | Ex 4 | <75 |  | 13 |  |  |
| 552/F85, 50/50 by weight | Ex 4 | <75 |  | 13 |  |  |
| 552/F85, 25/75 by weight | Ex 4 | <75 |  | 13 |  |  |

TABLE 3.2

| Detack Plasticizer | Example | 180° Peel on Glass, N/inch 30 min | 180° Peel on Glass, N/inch 7 days | Friction, lb | Clarity | Blocking |
|---|---|---|---|---|---|---|
| No tackifier* | Ex 3 |  | 8 | 5.6 |  |  |
| PET alone, no PSA, no plasticizer |  |  |  | 0.12 |  |  |
| Uniplex 552* | Ex 3 | 5.5 |  |  |  |  |
|  |  |  | 8.5 | 0.22 | clear @ 5 d |  |
|  |  |  | 6.4 |  | Slight x-tal @ 5 d | very little |
| Uniplex 280 CG* | Ex 3 | 4.8 |  |  |  |  |
|  |  |  | 8 | 0.24 | clear @ 5 d | little |
|  |  | non tacky |  |  | x-tal @ 5 d | little |
| Uniplex 260* | Ex 3 | 6 |  |  |  |  |
|  |  |  | 2.5 | 0.16 | Slight x-tal @ 5 d | No blocking |
| Uniplex 512* | Ex 3 | 5.9 |  | 1.9 | x-tal @ 2 hrs | blocking |
|  |  |  | 1.5 | 0.11 | x-tal @ 2 hrs |  |
| 552/F85, 75/25 | Ex 4 | 1.5 |  |  | not clear |  |
| 552/F85, 65/35 | Ex 4 | 9.6 |  |  | clear | no blocking |
| 552/F85, 50/50 | Ex 4 | 12 |  |  | clear | no blocking |
| 552/F85, 25/75 | Ex 4 | 7 |  |  | clear | no blocking |

*PSA used—1 mil PET coated with BASF acResin® A-250 cured at 30 mJ/cm2 UV cure dosage and at 10 gsm coat weight
x-tal=crystallized
Blocking, 0.3"×0.3" sample, 4.4 pound weight, in 50° C. oven
552=Uniplex 552 plasticizer
F85=Foral™ 85E tackifier Example 4

Uniplex 552 was blended with Foral™ 85 E tackifier at ratios of 25:75, 50:50 and 75:25 by weight. The blends were melted at 100° C. and then coated onto a clear polyester film to visually assess for clarity. Uniplex 552 and Foral™ 85E were also individually coated and assessed for clarity. Initially, all these coatings were clear. After 2 days, Uniplex 552 coating which was initially clear had turned white, and the 75:25 blend of Uniplex 525 and Foral™ 85E was cloudy. Foral™ 85E was clear, along with 50:50 and 25:75 ratios of Uniplex 552 and Foral™ 85E. All the three blends of the plasticizer and tackifier in the ratio of 75:25, 50:50 and 25:75 were tacky on exposure to heat and exhibited quick adhesion to the glass panel. The blocking test indicated that both 50:50 and 25:75 ratios were non-blocking at coat weights of 13 gsm powder sprinkled onto the surface of BASF acResin® A-250 (coated on 1 mil PET at 10 gsm and cured at 30 mJ/cm2). A 65:35 ratio of Uniplex 552 and Foral™ 85E was dusted onto the surface of the BASF acResin® A-250 PSA at 13 gsm and was heated to 110° C. on a hot plate. The surface of the PSA was tested for tack after 1, 10, 30 minutes, and 1 hour. In all these cases, the surface was tacky immediately after application of heat and remained tacky after 1 hour indicating that such a PSA has an open time of at least an hour. The peels of 50:50, 65:35 and 25:75 blends were measured by keeping these radiation exposed surfaces open for these various times, applying the open, tacky PSA surface to glass panel after that period of time and then dwelling on glass panel for 30 minutes followed by measuring the peel. The 65:35 blend had peels of 9.6, 9.6 and 8.5 N/inch on glass (after 30 minute dwell on glass panel) after open times of 0, 30 min and 60 minutes following exposure to heat to melt the detack layer. The 50:50 blend had peels of 10, 12 and 11 N/inch after open times of 0, 30 and 60 minutes following exposure to heat. These long open times are especially useful since these long times allow the label to wet out on the surface of the container that is being labelled and provides the no label look.

Example 5

BASF acResin® A-250 coated on a 1 mil PET pre-perforated facestock at 10 gsm and UV cured at 30 mJ/cm2 was sprinkled with 6.1 gsm of Uniplex 552 plasticizer. This coated surface was exposed to a 7200 watt/208 volt/35 amp Heraeus carbon IR emitter (Trinity module) using an automated shutter for a 1 sec exposure. The power level was 100 watt/square inch. The distance between the sample and the emitter was 3 inches. After exposure, the heated label was applied to a glass panel and peel measured after about a week to be 6.4 N/inch. This example demonstrates that with a footprint of a 2.5 feet IR unit installed in the web path in the machine direction, the web could run at a speed of 150 feet/minute to get an exposure time of 1 sec to tackify the detack layer. Under these conditions the adhesive got tacky to apply it to the product. By making the IR unit longer or increasing the power, even lower residence times can be achieved enabling higher web speeds.

Example 6

BASF acResin® A-250 coated on a 1 mil PET pre-perforated facestock at 10 gsm and UV cured at 30 mJ/cm2 was sprinkled with 6.1 gsm and 13 gsm of Foral 85E tackifier. These two detack layer sprinkled surfaces which were hazy were contacted with a hot surface maintained at 140° C. for about 2 seconds. The detack layers were seen to completely melt under these conditions. These activated films were applied to a glass panel and the coating laminates on glass were seen to be very slightly hazy but exhibited instant adhesion to glass. Over a 2-hour period the haziness was seen to be slightly higher but the adhesion was good to the glass substrate.

A typical example of the use of an embodiment of the invention, intended for illustrative purposes, follows.

A label stock manufacturer coats the PSA on a regular filmic or paper web, applies the detack layer to the adhesive surface, winds it and either ships the master roll or converted (slit) roll to a convertor.

The convertor takes the master roll, slits it if needed, prints it on the other side of the adhesive coated side, and forms smaller rolls (single lane label rolls) to ship to the customer. The perforating is done during this step either before printing, or after printing. In this example, under some circumstances, the convertor, prior to printing may pass the master roll through a cleaning station (such as by using a tacky roll or air flow or other means) to remove any detack material which may have transferred to the print surface during transportation and/or storage.

The adhesive coater can be by-passed by coating the adhesive at a convertor. One advantage of this approach is that it eliminates the creation of large master rolls which would have to be transported to the convertor. In large master rolls, the high pressures at the core of the master roll may cause blocking (i.e. failure of the detack layer to prevent the PSA from adhering to the back side of the face material or face stock). Here the steps followed are as follows:

A pre-slit roll of film or paper is printed, adhesive coated, and detack layer applied on the adhesive surface all on the press in a single operation. The pre-weakening of the web can be done at any stage during this process, i.e. before or after printing, or before or after adhesive coating or before applying detack layer or at the very end after all these steps are done. The slitting of the rolls to form single lane rolls is done during this process.

This slit material will then be sent to the labelling site where it is unwound and the adhesive/detack layer is converted into an effective PSA using NIR or heat. The now sticky labels are then singlulated from the pre-weakened roll and applied to products. This later process (unwinding, tackification of the detack layer and applying to container) is continuous and can be done at high labelling speeds (e.g. 600 labels/min) where required.

Above steps can done in a variety of ways. In an embodiment of the invention, the use of a pre-weakened web and thermal radiation exposure of the detack layer at the labelling system with the elimination of all release materials are the important features.

In some embodiments, the release system and the associated liner that becomes a waste stream in a standard label supply chain in eliminated. In another embodiment, a release-type liner is used, and the waste stream is reduced by allowing the liner, comprised of a low surface energy substrate, to be used multiple times. In one embodiment, a low surface substrate or release liner is wound up with the roll at the end of the coating process following the application of the detack layer so that it is between the detack layer and the bottom side of the substrate. The reusable interleaf material is introduced into the label laminate before rolling the label laminate up for storage and transport. The low surface energy material forms an interleaf and helps to prevent any potential blocking arising from the PSA migrating past the detack layer and contacting the substrate, especially at low levels of coverage of the detack system. When the roll is unwound for converting (weakening and/or printing) then the interleaf material is removed and rewound to be returned to the coating operation for reuse. The use of interleaf material can allow the use of lower levels of detack material whereby the detack system can be converted to a tacky material, during label application, more quickly. This may be advantageous for very high-speed labelling. The liner is paper-based or film-based with one or both sides coated with a low energy release composition. The release compositions are based on materials that provide a low energy surface. Some examples are commercial conventional silicone-based release systems from vendors like Wacker, Momentive, Dow Chemical, and such, non-silicone based compositions like C14 to C18 based fatty acids such as Quilon supplied by Zaclon, polyvinyl stearyl carbamates supplied by Mayzo. In some embodiments, the release values are tuned depending on the PSA used and surface coverage of the detack layer.

In yet another embodiment the detack layer may be activated at a convertor to form the PSA and a release layer printed on top of the printed face stock to form a self would PSA construction. In this scheme, a release layer is added at the convertor site but means that no activation is required during the labelling process. In another embodiment, the label laminate is printed to form labels, said labels are cut, activated and applied to containers.

As discussed above a key function of the detack layer is to prevent the PSA sticking to the face material which is to be printed and thus prevent blocking when the material is in roll-form. In one embodiment, the detack layer replaces the use of liner and a release system. In the industrial processes that use a liner, pressures in large rolls can be very high (>50 psi) at the core of the roll. In the systems of the present invention, because the liner may not be used, the overall thickness of the laminate is lower, so rolls may be made smaller which reduces the pressure at the core. In some circumstances where for example temperatures in transportation may be higher, thereby promoting blocking, the occurrence of blocking and/or transfer of the detack layer to the face material can be mitigated by using much smaller (lower diameter) rolls in each step of the process.

In one embodiment, spacers whose dimensions are larger than the dimensions of the detack layer may be sprayed on the PSA along with the spraying of the detack layer. In yet another embodiment, spacers who dimension are larger than the dimension of the detack layer may be sprayed in a separate process other than the spraying of the detack layer. The spacers may be located on the PSA either in a random manner or in a regular manner. The spacers can also be printed in regular intervals or randomly throughout the web or in certain regular intervals to further minimize the tendency of the roll to block under high pressure conditions of manufacture and/or storage. In one embodiment, the spacers are at least 1.5 times larger than the size (diameter or height) of the detack particles of the detack layer or even larger (greater than 2, 3 or even 5 times the diameter of the detack particles) to relieve the pressure exerted on the detack particles in the roll. In another embodiment, the spacers are twice or even larger than the diameter or the height of the detack particles. In one embodiment, the spacers have the composition of the detack material. In another embodiment, the spacers may be distinctly different such as glass, ceramic, polymeric elastomeric particles or other such microsphere particles or fibers or filaments. In some embodiments, the spacer particles may be hard such as hollow or solid glass beads or particles, hard pigment particles such as calcium carbonate or rubbery particles such as highly crosslinked elastomer particles. In another embodiment, these spacers may be printed or sprayed or deposited by other means such as sieving or dusting either before or just after adhesive coating and prior to spraying, dusting, etc. of the detack layer. These spacers can be introduced either in line or in an off-line step. In one embodiment, spacers are introduced before introducing the detack layer on the PSA. In yet another embodiment, the spacers can be printed on the print side of the facestock to again minimize and/or eliminate the tendency to block by reducing the pressure on the detack particles during manufacture and/or storage.

In yet another embodiment, the detack layer may have particles that impart slidability to the label such as hollow glass microspheres or silicone beads. These particles which provide slidability are chosen so that they stand or extend a little higher than the detack particles. With such slidable particles, the labels can be moved around on the surface and then activated using heat or near IR. In another embodiment, the label can be activated and still possess slidability due to the glass particles extending from the surface to provide the ability to move it around. This aspect of detackified PSA layer is applicable for other PSA applications beyond PSA labels. This aspect of slidability is also applicable for any application where PSAs are used such as conventional PSA labels used for envelope labelling, PSA tapes for a wide range of applications, graphics applications using PSAs such as promotional graphics, price marking graphics, fleet marking graphics used on the side of trucks etc.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

It will be appreciated that several of the above-disclosed and other features and functions, or alternatives or varieties thereof, may be desirably combined into many other different methods, systems or applications. Also, that various alternatives, modifications, variations or improvements therein may be subsequently made by those skilled in the art which are also intended to be encompassed by the following claims.

In the description above, for the purposes of explanation, numerous specific requirements and several specific details have been set forth in order to provide an understanding of certain embodiments. It will be apparent however, to one skilled in the art, that one or more other embodiments may be practiced without one or more of these specific details. The particular embodiments described are not provided to limit the invention, but to illustrate it. The scope of the invention is not to be determined by the specific examples provided above. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof to streamlining the disclosure and aiding in the understanding of various inventive aspects. This method of disclosure, however, is not to be interpreted or construed as reflecting an intention that the invention requires more features than are expressly recited in each claim. Rather, as the following claims reflect, inventive aspects may lie in less than all features of a single disclosed embodiment. In another situation, an inventive aspect may include a combination of embodiments described herein or in a combination of less than all aspects described in a combination of embodiments.

The invention claimed is:

1. A label laminate comprising:
   a filmic or a paper substrate, said substrate having a first surface and a second surface;
   a pressure sensitive adhesive (PSA) layer, said PSA layer being tacky and having a first surface and a second surface, the first surface of the PSA being in contact with the second surface of the substrate; and
   a detack layer on top of the second surface of the PSA layer, said detack layer comprising a mixture of at least a solid tackifier and a solid plasticizer the tackifier to the plasticizer weight ratio being in the range 25:75 to 75:25, and having a melting point above about 50° C., wherein the detack layer has a surface coverage of less than 100% of the second surface of the PSA layer.

2. The label laminate of claim 1, wherein the PSA layer to the detack layer weight ratio is in the range of about 1:2 to about 10:1.

3. The label laminate of claim 1, further comprising spacers located on top of the second surface of the PSA layer and/or the detack layer to minimize blocking.

4. The label laminate of claim 1, wherein the detack layer is provided in a form of a plurality of filaments and/or ellipsoids sprayed on the second surface of the PSA to form the detack layer, the filaments and/or the ellipsoids are of different shapes, lengths and/or thicknesses disposed in a random distribution on top of the second surface of the PSA.

5. The label laminate of claim 1, wherein the detack layer is provided in a form of a powder.

6. The label laminate of claim 5, wherein the powder is sprayed on the PSA layer.

7. The label laminate of claim 1, wherein the surface coverage is obtained by spraying, printing, sprinkling, sieving, electrostatic deposition dusting or powder coating the detack layer on top of the second surface of the PSA.

8. The label laminate of claim 1, wherein the detack layer is tackifiable in less than 3 seconds upon exposure to a thermal or an infra-red radiation source and upon tackifying, the detack layer begins blending with the PSA layer to form a PSA blend, the detack layer and the PSA blend being tacky, and the detack layer and the PSA blend staying tacky for a period of at least 30 minutes.

9. The label laminate of claim 8, wherein a glass transition temperature of the PSA blend is within ±25% of the glass transition temperature of the PSA.

10. The label laminate of claim 1, wherein the substrate comprises at least a perforated line or a weakened line configured to convert the label laminate to a plurality of individual labels.

11. The label laminate of claim 1, wherein the PSA is at least one polymer selected from a group consisting of acrylic polymers, acrylic copolymers, polyurethanes, silicone polymers, copolymers of styrene and butadiene, copolymers of styrene and isoprene, copolymers of styrene and ethylene butylene, wherein the at least one polymer is with or without additives, wherein the acrylic polymer includes a comonomer selected from a group consisting of dioctyl maleate and/or dibutyl fumarate, and wherein the acrylic copolymer is vinyl acrylics.

12. The label laminate of claim 1, wherein the PSA has a coat weight of about 3 gsm to about 50 gsm.

13. The label laminate of claim 1, wherein the first surface of the substrate is free of any release material, thereby enabling printing an indicia on the first surface of the label laminate.

14. The label laminate of claim 1, wherein the PSA is a hot melt pressure-sensitive adhesive.

15. The label laminate of claim 1, wherein the pressure-sensitive adhesive is an acrylic pressure sensitive adhesive comprising a tackifier.

16. The label laminate of claim 1, wherein the filmic substrate is a plastic film and the label laminate remains clear after exposure to heat to tackify the detack layer, thereby forming a clear label providing a no-label look to a product to which the clear label is applied.

17. The label laminate of claim 1, wherein a label can be separated before the detack layer is tackified by an external heat source.

18. The label laminate of claim 1, further comprising a reusable interleaf material introduced into the label laminate before rolling the label laminate up for storage and transport.

19. The label laminate of claim 1, wherein the label laminate is die cut to provide labels, said labels are stacked to form a magazine, said magazine used to dispense labels.

20. The label laminate of claim 1, wherein the label laminate is printed to form labels, said labels are cut, activated and applied to containers.

21. The label laminate of claim 1, wherein the PSA is deposited on the filmic or the paper substrate using water based systems selected from a group consisting of emulsion polymers or copolymers, or as viscous syrups, or using solvents, or as hotmelts melted and coated above 100° C., or warm melts melted and coated below about 100° C.

* * * * *